US006712204B1

(12) United States Patent　　(10) Patent No.: US 6,712,204 B1
Toussaint　　(45) Date of Patent: Mar. 30, 2004

(54) FOLDABLE CARRIER FOR RETAINING OBJECTS

(76) Inventor: Stephen M. Toussaint, 10425 Snowy Owl Ct., Granger, IN (US) 46530

( * ) Notice: Subject to any disclaimer, the term of this patent is extended or adjusted under 35 U.S.C. 154(b) by 0 days.

(21) Appl. No.: 09/722,529

(22) Filed: Nov. 28, 2000

Related U.S. Application Data

(62) Division of application No. 09/017,602, filed on Feb. 3, 1998, now Pat. No. 6,189,689.
(60) Provisional application No. 60/037,792, filed on Feb. 4, 1997.

(51) Int. Cl.[7] .............................................. B65D 85/57
(52) U.S. Cl. ..................... 206/308.3; 206/312; 206/474
(58) Field of Search ............................. 206/232, 308.1, 206/308.3, 311, 312, 460, 474, 476, 482, 756, 759, 806, 813; 229/68.1, 87.01, 87.03; 283/56, 116; 248/100, 640; 402/79, 80 P; 281/31, 38, 45

(56) References Cited

U.S. PATENT DOCUMENTS

| | | | | |
|---|---|---|---|---|
| 4,976,354 A | * | 12/1990 | Levy | 206/476 |
| 5,085,318 A | * | 2/1992 | Leverick | 206/312 |
| 5,560,492 A | * | 10/1996 | Eren | 206/756 |
| 5,713,462 A | * | 2/1998 | Hansen | 206/312 |
| 5,775,490 A | * | 7/1998 | Baker et al. | 206/312 |
| 5,915,563 A | * | 6/1999 | Gefen et al. | 206/312 |

* cited by examiner

*Primary Examiner*—Luan K. Bui
(74) *Attorney, Agent, or Firm*—Brown Raysman Millstein Felder Steiner

(57) ABSTRACT

A carrier for securely retaining one or more objects is provided, cut and scored from a unitary blank of paperboard or similar foldable sheet material so that it can be folded into two overlying panels and then manually fastened so that one panel is characteristically bowed away from the other to form an interior space. This bowed panel has at least one u-shaped mouth opening into this interior space, cut through the bowed panel face and large enough to allow an object to be loosely inserted through it with one-hand and retained therein for storage or transport. This carrier can then be integrated into the design of another product. Also, the carrier can be attached to the surface of selected articles with an adhesive strip applied to the back of the carrier or by using a standard pronged fastener that extends through openings provided in the carrier's back panel or by some other suitable attachment device. Additionally, a top panel, a cover panel and a cover fastening tab can be provided to cooperatively overlie the front of the carrier and further secure the portion of the object that extends from the mouth opening across both its face and top sections thereby assuring secure storage and transport without regard to the carrier's physical orientation.

26 Claims, 21 Drawing Sheets

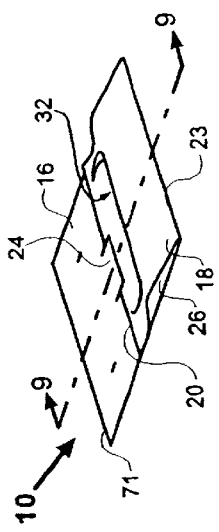
FIG. 8d
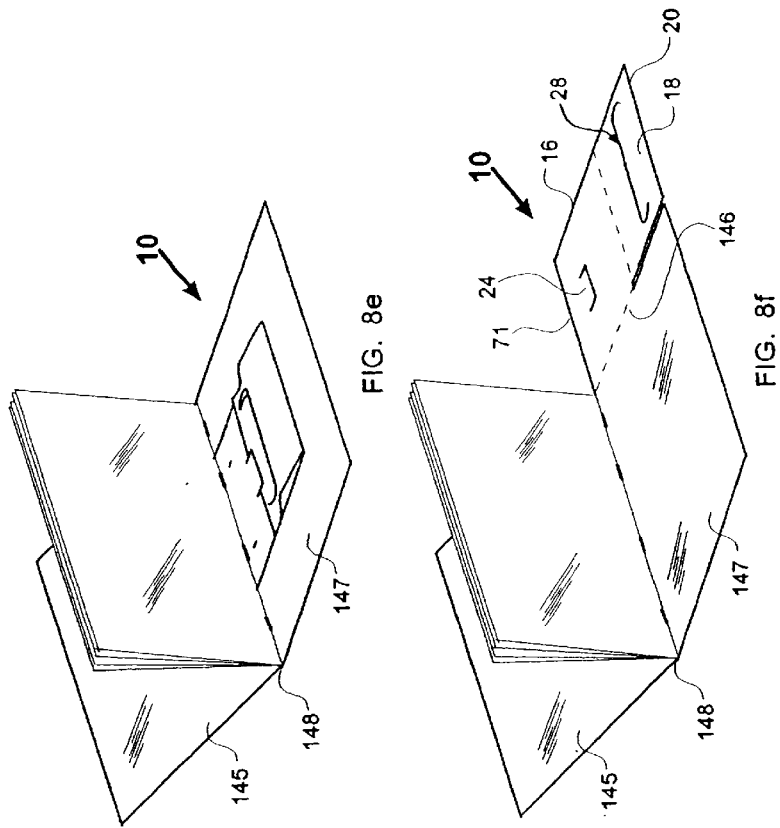
FIG. 8e
FIG. 8f
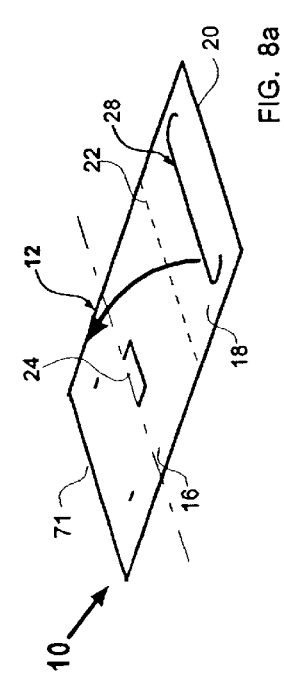
FIG. 8a
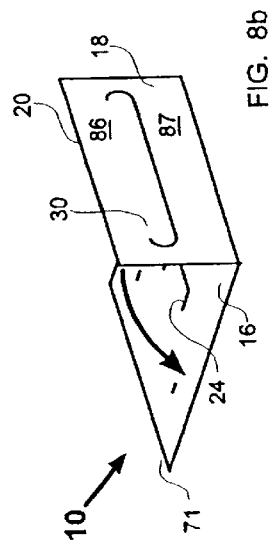
FIG. 8b
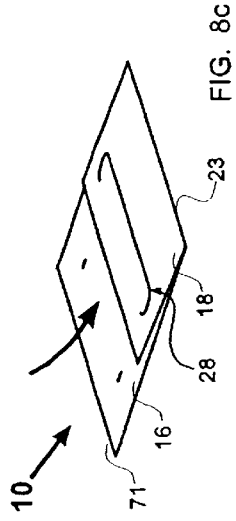
FIG. 8c

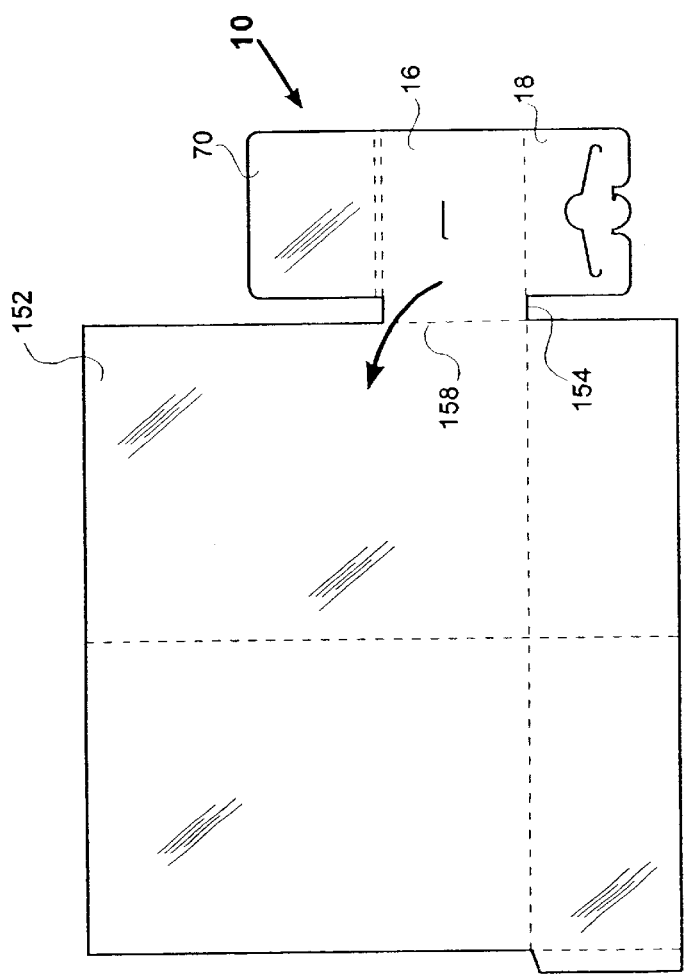
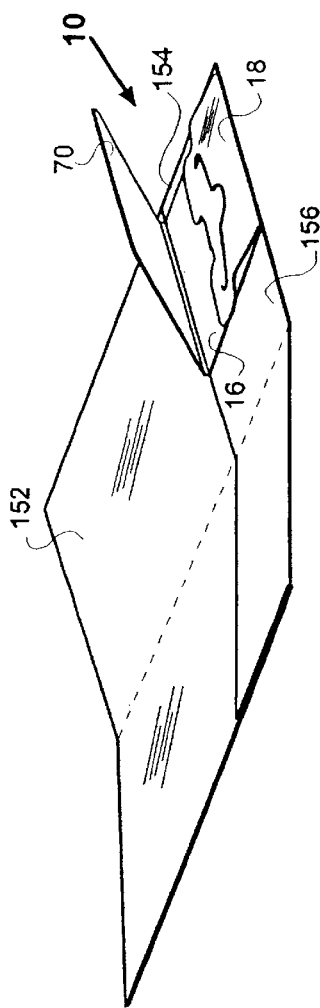
FIG.12a
FIG.12b 20-20

FOLDABLE CARRIER FOR RETAINING OBJECTS

RELATED APPLICATION

This application is a divisional of U.S. patent application Ser. No. 09/017,602, filed on Feb. 3, 1998, U.S. Pat. No. 6,198,689 which application in turn application Ser. No. 60/037,792, filed on Feb. 4, 1997.

FIELD OF THE INVENTION

The present invention relates generally to carriers for removably retaining articles therein, and, more specifically, to such carriers formed from a folded flat web of flexible material.

BACKGROUND OF THE INVENTION

Frequently, it is desirable to store various small objects such as computer disks, photographs, tape cassettes and index cards in portable packages or carriers for transport or storage. Various prior devices exist for that purpose, including hanging file disk pockets, hanging pockets, and 3½" diskette viewer folders from Globe-Weis of Atapco Office Products Group, St. Louis, Mo. However, such conventional containers may be deficient in certain circumstances.

Hanging file pockets, add-on pockets and the like are typically open-ended. Therefore, disks and other objects placed into the pockets can fall out, particularly if the pocket becomes inverted in use or transport. Some prior devices appear to respond to that difficulty by making the pocket more rigid and closely dimensioned to the object to be carried so as to grip the object better. Unfortunately, such devices have a tendency to be more difficult for the object to be inserted into and removed from, often requiring the users to employ both hands in the effort.

Many prior carriers were also integrally formed with or permanently secured to an underlying support, such as a folder, ring binder or documentation package. When the object is to be removed from the package, a separate, additional carrier has been employed. Also, each such package has typically employed a carrier specialized in dimension and materials which is particularly adapted to that package type alone. Thus, even where the carriers have been removable, efficient collection and storage by users of carriers from diverse packages has been inhibited.

Accordingly, it is an object of the present invention to provide an improved carrier for storing and transporting a small object or article. Other objects include the provision of a carrier which:

a. is inexpensive and convenient to manufacture and assemble;
b. is durable and protective of an object inserted therein,
c. permits an object to be readily inserted and removed therefrom for repeated storage therein;
d. is reusable and detachable from its initial packaging;
e. can be easily attached to or integrated into the design of various packages; and
f. securely retains an object once deposited therein.

SUMMARY OF THE INVENTION

These and other objects of the present invention are attained by the provision of an object carrier formed from a folded web of flexible material having an enclosed pocket defined thereby regardless of the insertion of the object and a slit opening to that pocket which is biased open. The pocket is preferably formed by retaining one portion of the web in bowed relation to another portion of the web, and a third portion can be employed to overlay the bowed portion as a cover. The web may be integrally formed as part of the underlying package and/or detachable therefrom.

The present invention provides the carrier from a substantially flat web of flexible material which is folded and assembled to define a pocket space and an over-pocket space for retaining at least one object on three sides or aspects. A cover panel may also be formed from a fold in the web to overlie both such spaces to retain the object therein from above and across its face. A portion of the web may also be used for attaching the carrier to another body or structure.

Especially preferred embodiments include a portable carrier which may be attached to a variety of surfaces, and which includes a single piece body, cut and scored for manual assembly from a unitary blank of suitably sized semi-flexible sheet material such as paperboard, which has an interconnected front panel, back panel, top panel and cover panel. The back panel has a fastening slit which interlocks with a locking tab and lock notch arrangement extending from the fastening edge of the front panel along with a first over-flap and a second over-flap that cooperate to hold the carrier in its folded shape when the front panel is folded over the back panel. The cover panel is then folded to overlie the front panel and thereby retains an object deposited into the carrier's pocket space from above and across the object's exposed face. A strip of adhesive or other attachment device is attached to the back panel so that, when the body is folded to form a carrier, the carrier may be attached to another article, such as an interior surface of a file folder. When the carrier is attached to an interior surface of a file folder, closure of the file folder impinges the overlying carrier cover panel to hold the cover panel in a closed position. Once attached in this way to a file folder, the carrier provides a secure storage and transport device for objects deposited therein, while also permitting quick and easy, one-handed access to the object retained. The nature of the arrangement permits standardization of carriers across a variety of applications and easy reuse and removability of the carrier.

Other objects, advantages and novel features of the present invention will become readily apparent from the following drawings and detailed description of preferred embodiments.

BRIEF DESCRIPTION OF THE DRAWINGS

FIG. 8a is a perspective view of the unfolded interior face of the embodiment shown in FIG. 7.

FIG. 8b through 8f are sequential perspective views of the embodiment shown in FIG. 8a with various folding and assembly and integration operations being performed.

FIG. 12a is a plan view of yet another embodiment of the present invention.

FIG. 12b is a perspective view of the embodiment shown in FIG. 12a in a folded orientation.

Figure 1:
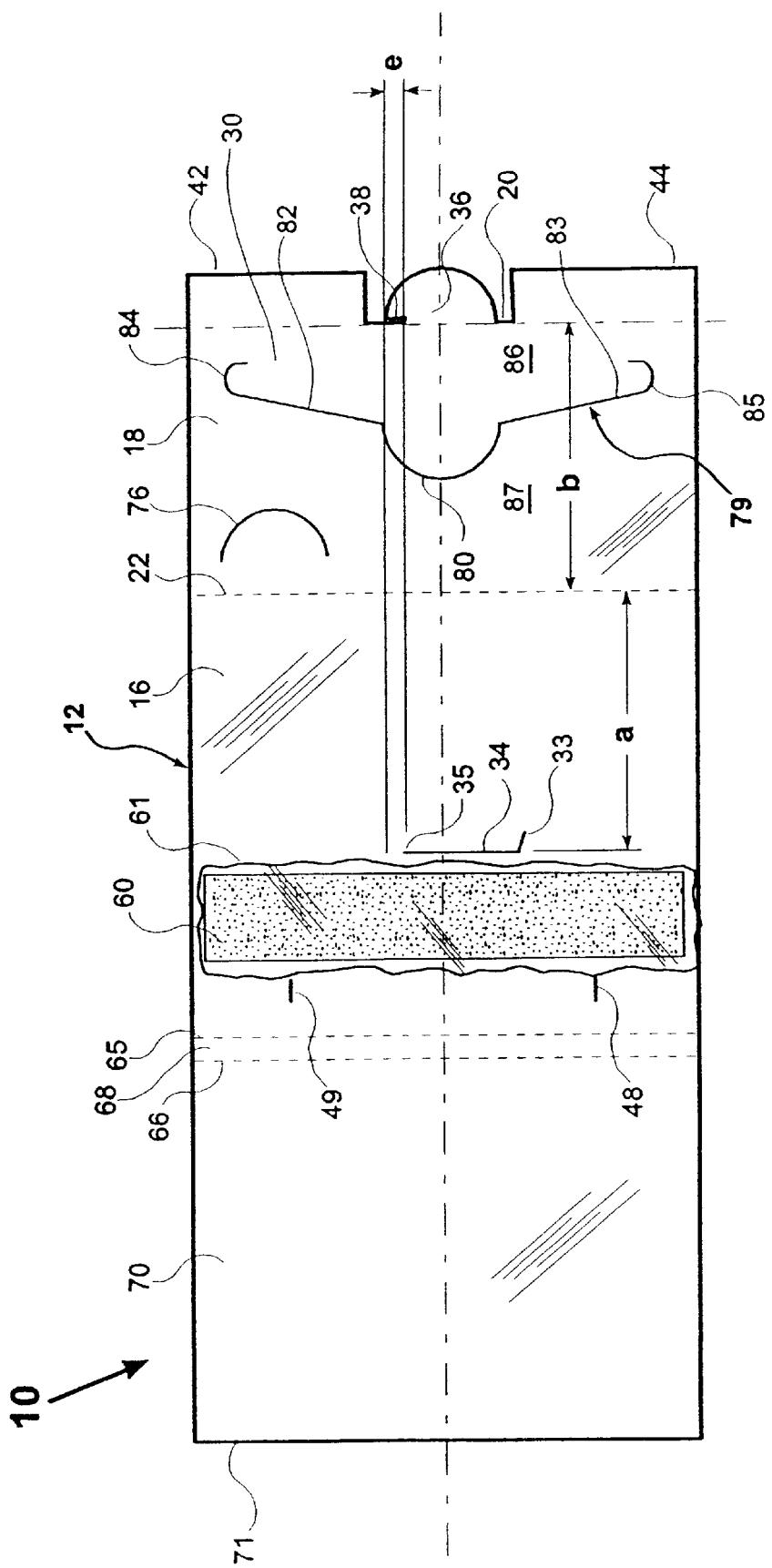
FIG. 1 is a plan view of the exterior face of a carrier according to the present invention in its flattened, unfolded state.

Corresponding reference characters indicate corresponding parts throughout the several views. Although the drawings represent various embodiments of the present invention, the drawings are not necessarily to scale and features may be exaggerated in order to better illustrate and explain aspects of the present invention.

DETAILED DESCRIPTION OF PREFERRED EMBODIMENTS

The embodiments disclosed in the detailed description below are not intended to be exhaustive or to limit tie invention to merely the precise forms disclosed. Rather, the embodiments selected for the description are disclosed so that others skilled in the art may utilize their teachings. The limits of the patent are defined by the appended claims.

Figure 4:
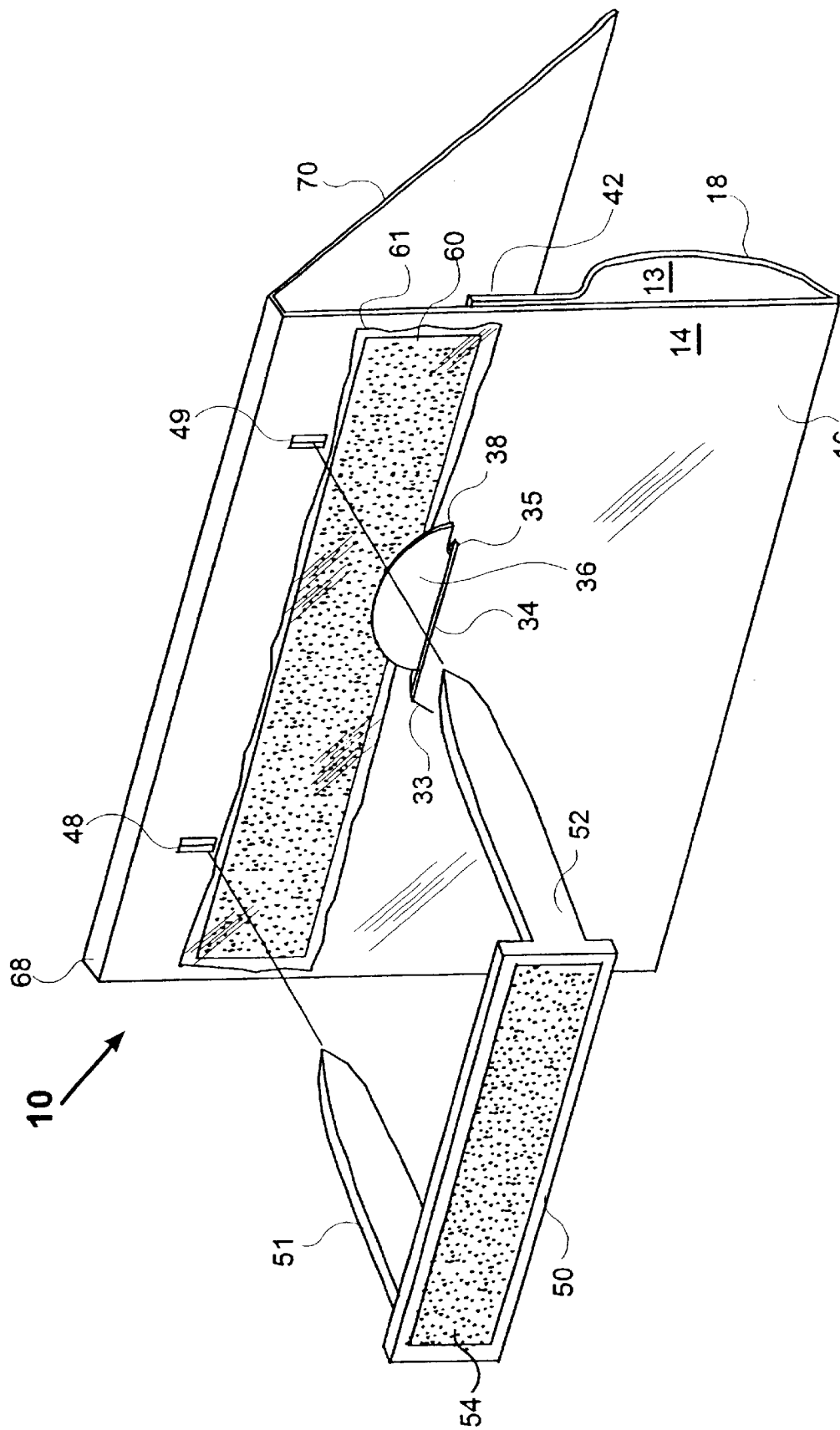
FIG. 4 is a perspective rear view of the carrier shown in FIG. 2e with a bipronged fastener.

FIG. 1 shows a carrier 10 according to a preferred embodiment of the present invention. Carrier 10, in its flattened or unfabricated state, includes a substantially flat web or body 12 and a thin strip of adhesive 60 which is, for example, double sided and covered by a larger protective strip of removable release liner 61 on its exposed side. Body 12 includes a front panel 18, a back panel 16, a top panel 68 and a cover panel 70. Front panel 18 and back panel 16 are preferably separated by a bottom scoreline 22 which forms the bottom edge 23 of carrier 10 when fully folded and assembled, as described in further detail below. Back panel 16 and cover panel 70 are preferably separated by a set of parallel score marks, namely a first top scoreline 65 and a second top scoreline 66, which together define the top panel 68 of carrier 10 when fully folded. A single score mark could alternatively be provided so that the width of top panel 68 is minimal if noticeable at all. Back panel 16 also contains a fastening slit 34, cut through its faces, laterally offset from center by a distance "e", oriented parallel to and spaced away from bottom scoreline 22 by a distance designated "a" in FIG. 1. Fastening slit 34 also has an angled extension 33 opposite its offset end 35 as shown in FIG. 1. Additionally, back panel 16 includes a first prong slit 48 and a second prong slit 49 which are adapted to receive the first prong 51 and the second prong 52 of a standard bipronged fastener 50 as shown in FIG. 4.

Figure 6:
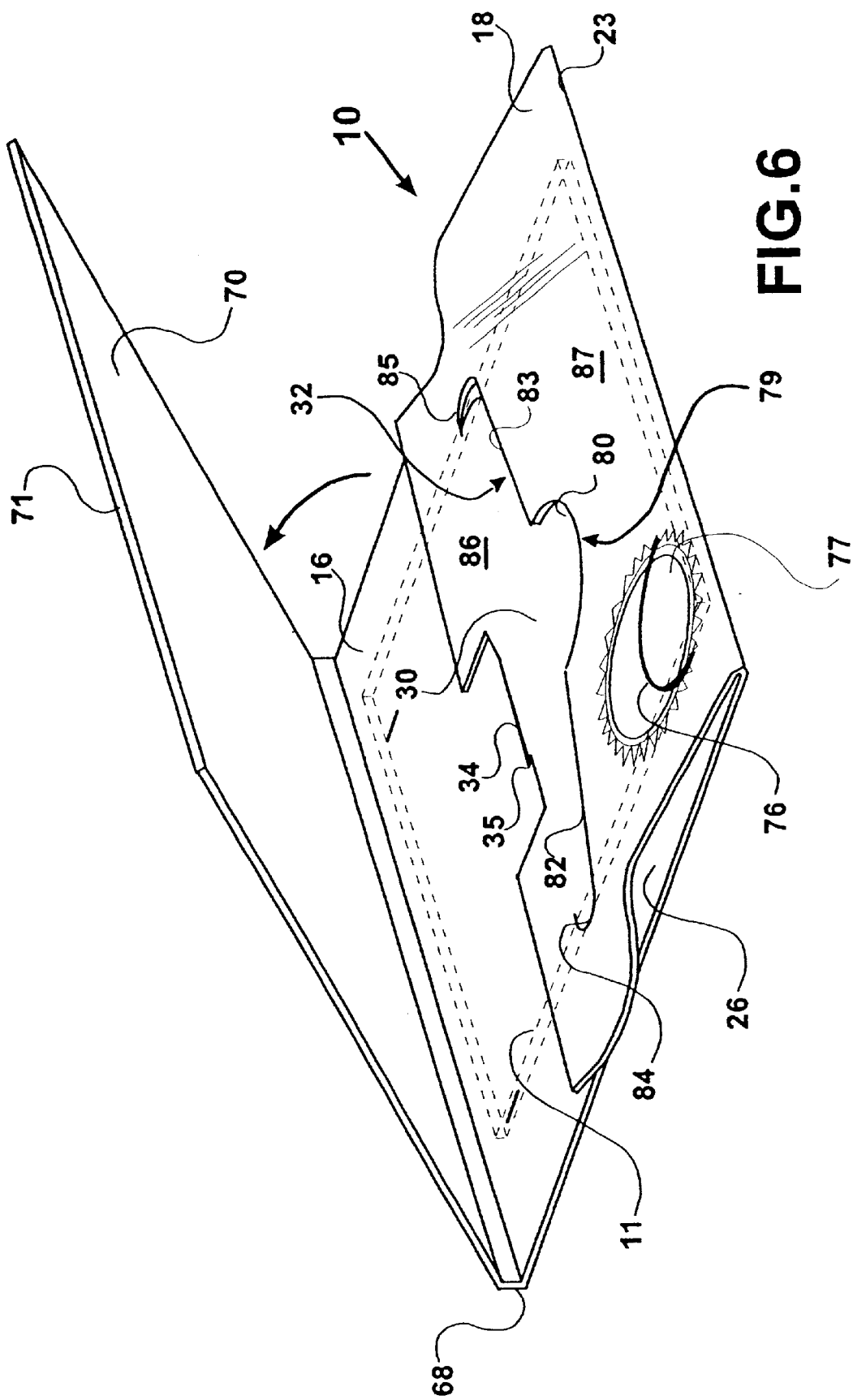
FIG. 6 is a perspective view of a carrier according to the present invention in a folded and assembled state with the cover panel shown open and the retained object shown in broken lines.

Front panel 18 includes a mouth flap 79, a cut slit which substantially divides front panel 18 into an upper portion 86 and a lower portion 87 and defines the width of pocket mouth opening 32 when carrier 10 is fully folded and assembled as best shown in FIG. 6. Mouth flap 79 is, for example, bow shaped and includes a center curve 80, a first angled side 82, a second angled side 83, a first end curve 84, and a second end curve 85. Mouth flap 79 serves to provide the pocket mouth opening 32 which is biased toward an open position leading into pocket space 26 by the flexing of front panel 18 of carrier 10 when assembled as is described in further detail below.

Fastening edge 20 of front panel 18 has, extending from it, a locking tab 36 which includes a lock notch 38, inset and in registration with the offset end 35 of the fastening slit 34. Disposed to the sides of this locking tab 36 are a first over-flap 42 and a second over-flap 44 extending from fastening edge 20. Lock notch 38 is also in line with fastening edge 20, is inset a distance "e" from the edge of the locking tab 36 and is spaced from bottom scoreline 22 by a distance "b". The amount by which distance "b" is greater than distance "a" determines the thickness of pocket space 26, as will become apparent from the following description of the assembly and operation of carrier 10.

Assembly

Figure 2:
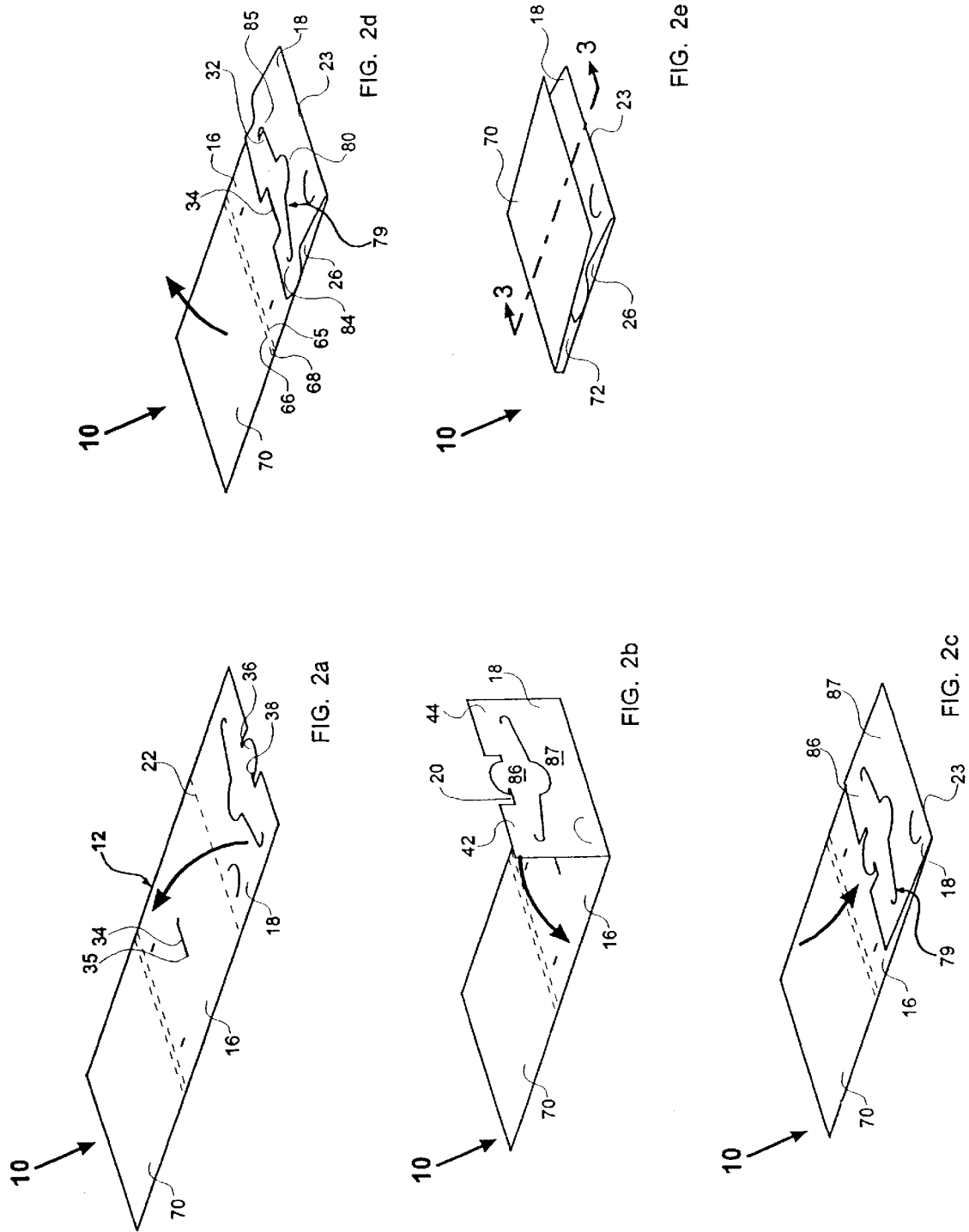
FIG. 2a is a perspective view of the unfolded interior face of the carrier shown in FIG. 1.
FIGS. 2b through 2e are sequential perspective views of the carrier shown in FIG. 2a with various folding and assembly operations being performed.

FIGS. 2a through 2e show a folding and assembly process for a carrier 10 of the present invention. As shown in FIG. 2a, body 12 can readily be cut or stamped from a single piece of substantially flat and preferably semi-flexible material during the manufacturing process.

Figure 3:
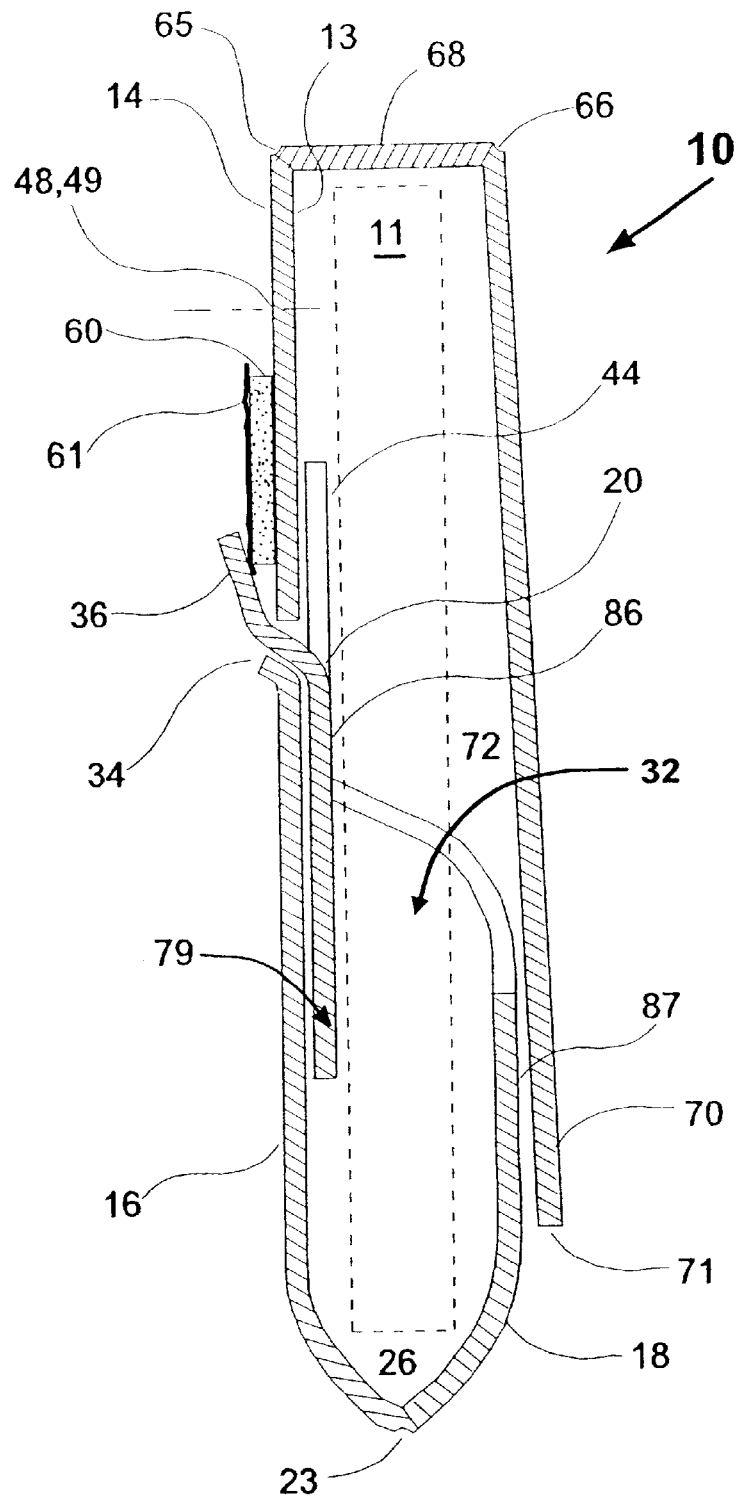
FIG. 3 is a cross-sectional view of the completed carrier taken substantially along line 3—3 of FIG. 2e.

Carrier 10 is assembled by first folding front panel 18 upwardly along bottom scoreline 22 and then downwardly toward back panel 16, as shown by the arrows in FIGS. 2a and 2b, so that the interior face 13 of each is in contact as best shown in FIG. 2c and FIG. 3. Upper portion 86 of front panel 18 is then pressed toward back panel 16 to separate upper portion 86 from lower portion 87 along mouth flap 79. Upper portion 86 is slid along back panel 16 toward bottom edge 23, as shown by the arrow in FIG. 2c, which causes lower portion 87 of front panel 18 to flex or bow outwardly generally along mouth flap 79 so that the lower portion 87 becomes spaced or bowed from back panel 16 while upper portion 86 remains substantially planar with back panel 16 and the pocket space 26 is formed. Locking tab 36 is aligningly moved laterally a distance "e" and inserted through fastening slit 34. Lock notch 38 of locking tab 36 is defined by fastening edge 20 so that once it is inserted through fastening slit 34, lock notch 38 returns a lateral distance "e" to overlie the offset end 35 of fastening slit 34, as shown in FIG. 4, and secures the locking tab 36 in position. Cover panel 70 is now folded along parallel score marks, namely a first top scoreline 65 and a second top scoreline 66, to overlie front panel 18, as shown by the arrow in FIG. 2d; Carrier 10, when thus assembled, creates an over-pocket space 72 above pocket space 26 and between back panel 16 and cover panel 70 as shown in FIG. 2e. An object 11, such as a diskette or like article, may be placed within this over-pocket space 72 and partially inserted in pocket space 26 formed by mouth flap 79 and the outwardly bowed lower portion 87 of front panel 18 for convenient, secure transportation and storage as shown in FIG. 3 and FIG. 6. FIG. 3 shows the interlocking connection between front panel 18 and back panel 16 of assembled carrier 10.

Referring now to FIG. 4, after the release liner 61 is removed from the strip of adhesive 60, locking tab 36 may be adhered to back panel 16, leaving the remaining portion of the strip of adhesive 60 exposed. Carrier 10 may be affixed to a selected surface of a container or underlying package by pressing the remaining portion of the exposed strip of adhesive 60 into contact with the package's surface. Depending upon the nature of the adhesive selected, the carrier can be permanently, releasably or repeatedly bound to the package.

Alternatively, the release liner 61 may be left in place and carrier 10 may be attached to a package or surface using a bipronged fastener 50. Once carrier 10 is folded and assembled according to the procedure illustrated in FIGS. 2a through 2e, first prong 51 and second prong 52 of bipronged fastener 50 are inserted through first prong slit 48 and second prong slit 49 from the exterior face 14 of back panel 16 to permit attachment of carrier 10 with the bipronged fastener 50 to a standard twin-hole punched file folder. Bipronged Listener 50 may optionally carry an additional fastener adhesive strip 54 that allows it to be affixed to the surface of a file folder 150 or other selected package as shown in FIG. 5a.

Figure 5A:
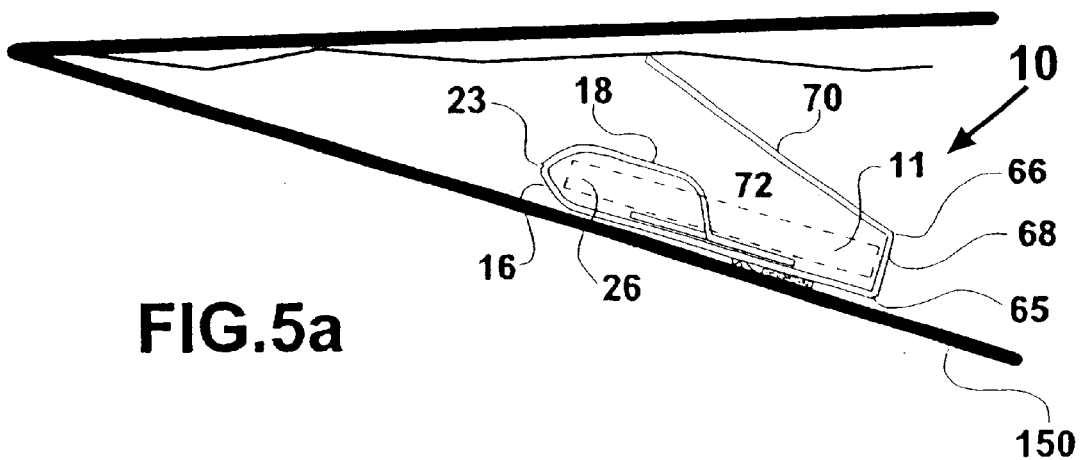
FIGS. 5a and 5b are side elevational views of a carrier according to the present invention affixed to an interior surface of a file folder.
Figure 5B:
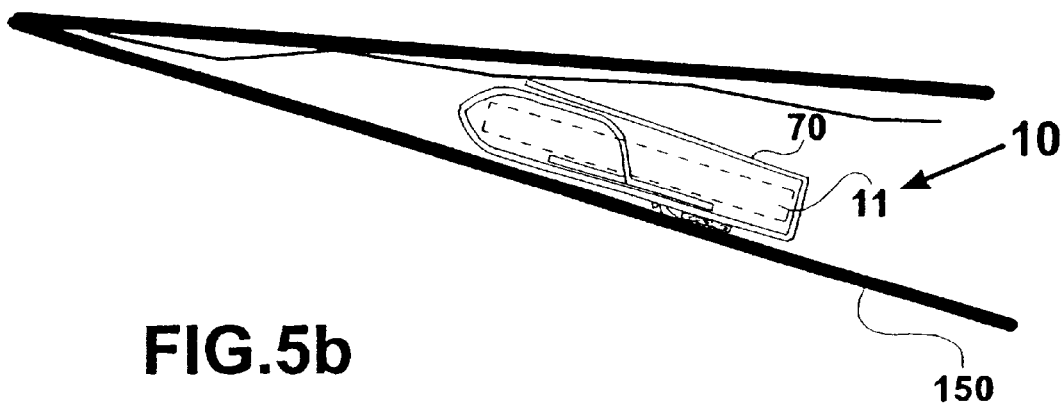

As best shown in FIGS. 5a and 5b, once carrier 10 is attached to an inside surface or interior page of a file folder 150, closure of the file folder 150 and its contact with cover panel 70 permit the cover panel 70 to remain in engagement with front panel 18, as shown in FIG. 5b. The impingement between the file folder 150, or its contents, and cover panel 70, when the file folder 150 is closed, can prevent carrier 10 from accidentally opening and discharging a retained object 11. The overlap between cover panel 70 and front panel 18 enhances the positive closure provided by the abovementioned impingement. Also, parallel score marks, namely the first top scoreline 65 and the second top scoreline 66, further enhance the tendency of carrier 10 to remain closed by providing cover panel 70 with clearance of the thickness of object 11 to generally assume this folded position overlying front panel 18. As such, carrier 10 resists opening so long as the file folder 150 is closed. When affixed to a file folder 150 in the above-described manner, carrier 10 secures the object 11 (shown in broken lines) loosely deposited within pocket space 26 while also allowing quick and easy one-handed removal and reinsertion of the object 11 whenever file folder 150 is opened.

An additional feature of the present invention is depicted in FIG. 6 An optional retaining tab 76 is provided, which in an exemplary embodiment is a cut semicircular slit in front panel 18. Retaining tab 76 is disposed on front panel 18 so that, when separated, retaining tab 76 receives the distal edge 71 of cover panel 70 when cover panel 70 is folded to overlie front panel 18 As such, retaining tab 76 retains cover panel 70 in its folded, closed position and additionally secures the object 11 in carrier 10 when carrier 10 is used to transport object 11. Additionally, a sticker-seal 77 may be applied to jointly overlay the cover panel 70 and the retaining tab 76, as shown in FIG. 6, thereby securing the retained object 11 from pilferage during retailing operations.

Figure 7:
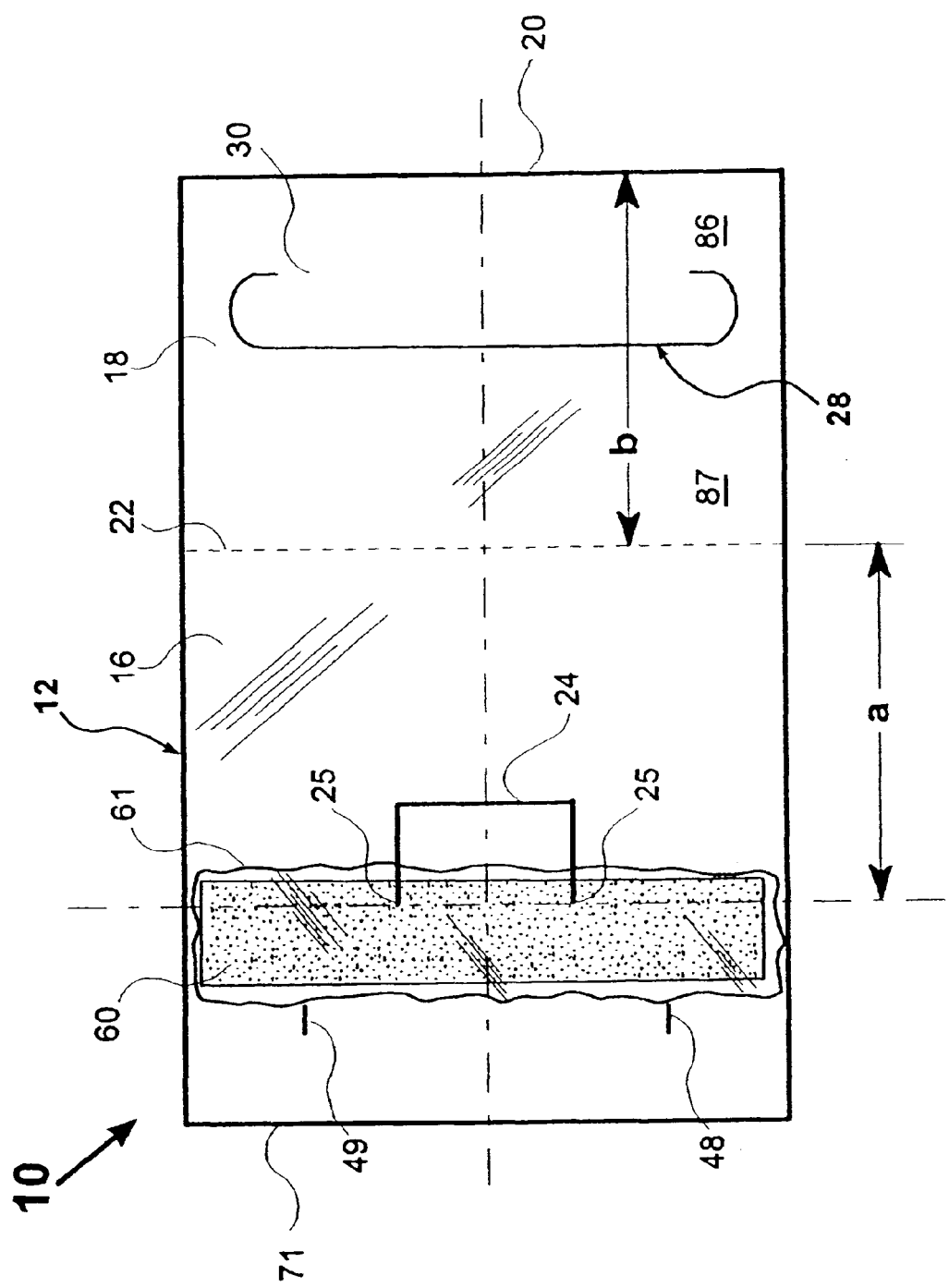
FIG. 7 is a plan view of die exterior face of another embodiment of the present invention in its flattened, unfolded state.
Figure 9:
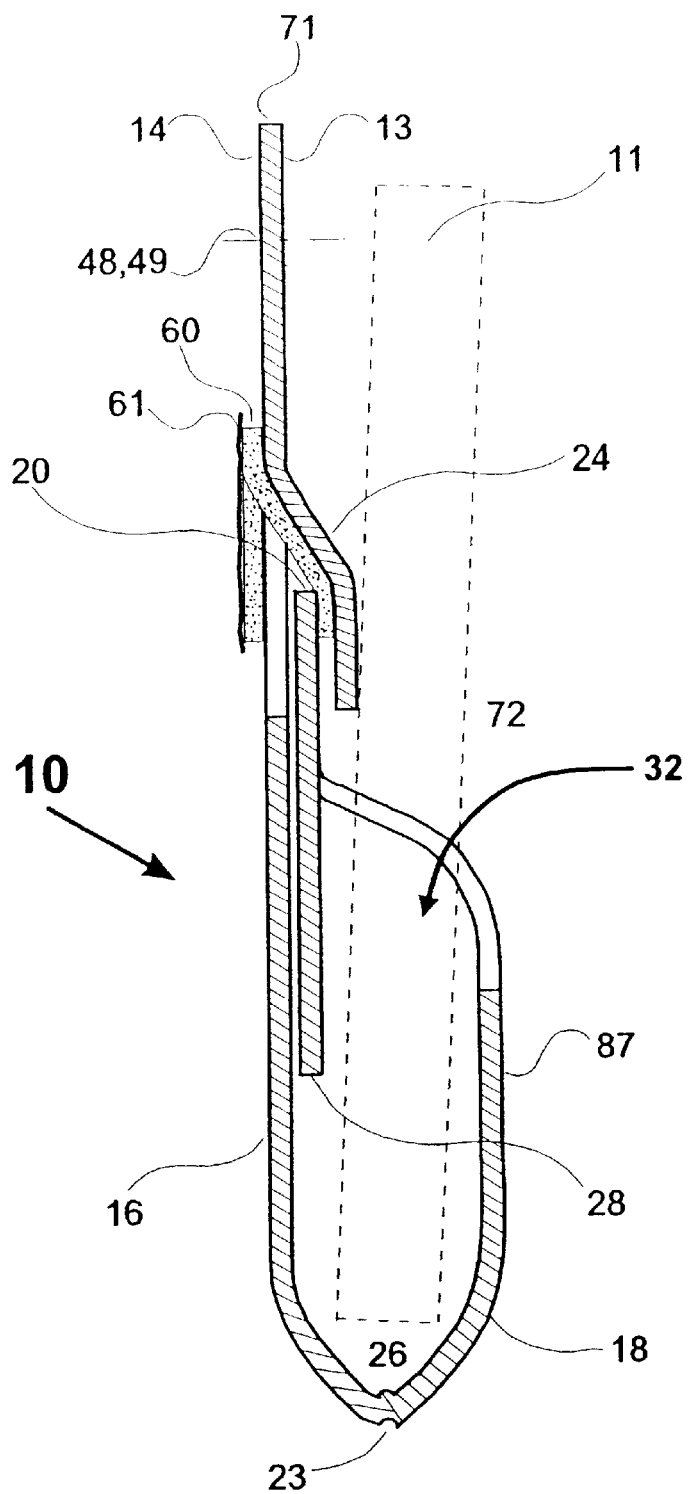
FIG. 9 is a cross-sectional view of the completed embodiment taken substantially along line 9—9 of FIG. 8d.

Another alternate embodiment of the present invention is shown in FIG. 7. Here carrier 10 has a back panel 16 that has cut through its faces a c-shaped fastening tab 24 with two extremity points 25. A front panel 18 has a simple fastening edge 20 and a c-shaped pocket mouth flap 28 cut through its faces and joined at one side along a zone of attachment 30 to the upper portion 86 of the front panel 18. Carrier 10 is assembled by first folding front panel 18 upwardly along the bottom scoreline 22 and then downwardly toward the back panel 16 as shown by the arrows in FIGS. 8a and 8b. Upper portion 86 of front panel 18 is then pressed toward back panel 16 to separate upper portion 86 from lower portion 87 along pocket mouth flap 28. Upper portion 86 is slid along back panel 16 toward bottom edge 23, as shown by the arrow in FIG. 8c, which causes lower portion 87 of front panel 18 to flex or bow outwardly generally along pocket mouth flap 28 so that the lower portion 87 becomes spaced or bowed from back panel 16 while upper portion 86 remains substantially planar with back panel 16 and the pocket space 26 is formed. Fastening edge 20 is then inserted under fastening tab 24 as shown in FIG. 8d. Carrier 10 can then be removably or permanently bound or stapled near the distal edge 71 of the back panel 16 along with the pages of a booklet, as shown in FIG. 8e, for later assembly and storage of an object. Carrier 10, when integrated along a lateral edge of back panel 16 at a lateral scoreline 146 with the right cover panel 147 of a booklet or brochure, as shown in FIG. 8f, can also be assembled as just described and an object 11, such as a diskette, may be placed within the pocket space 26 for storage. In the embodiments described in FIGS. 8e and 8f, the left cover panel 145 and cover spine 148 of the booklet or brochure perform the retaining function performed by the top panel 68 and cover panel 70 of the carrier 10 in a previously described embodiment. FIG. 9 shows the interlocking connection between front panel 18 and back panel 16 when carrier 10 is assembled.

Figure 10:
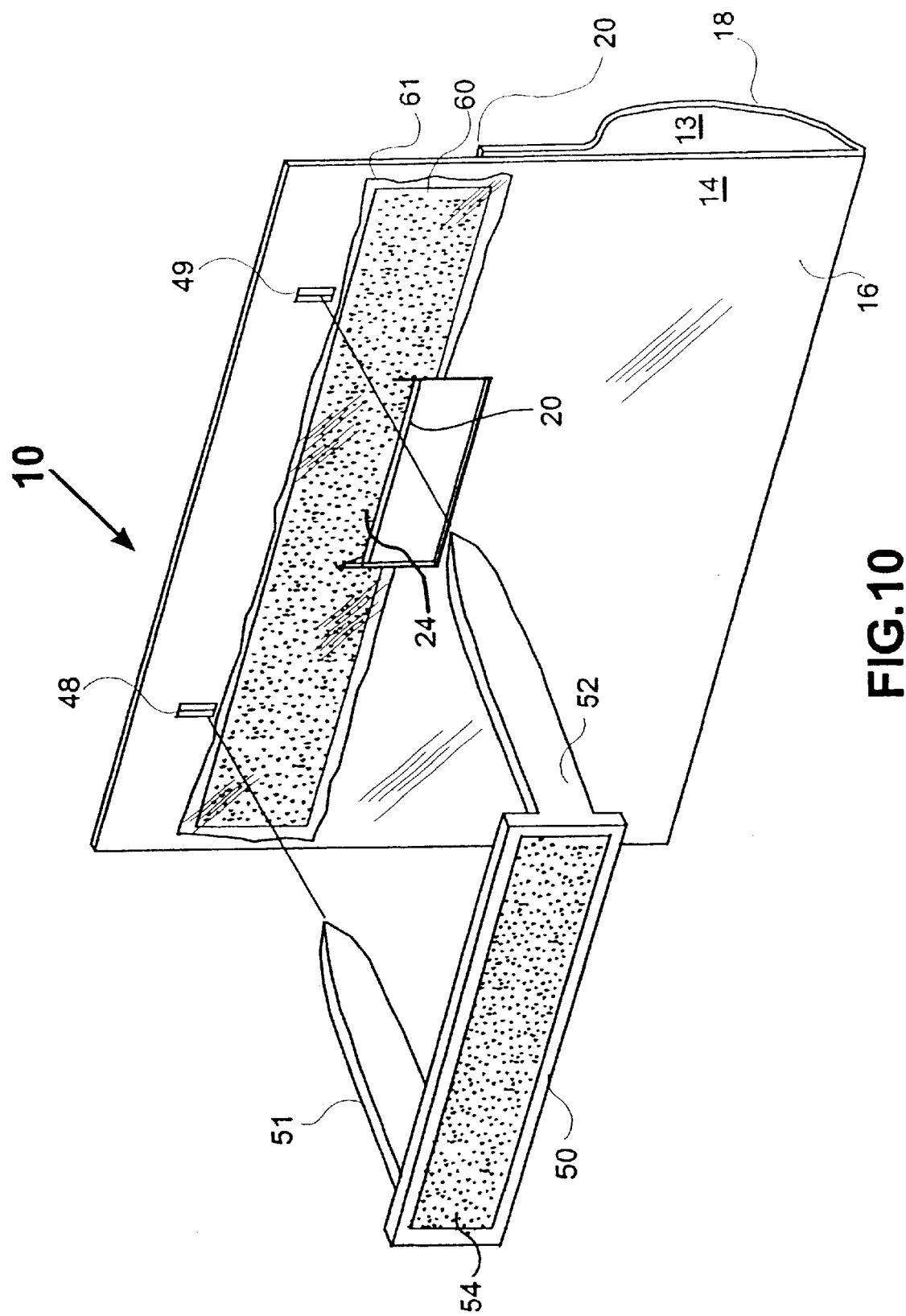
FIG. 10 is a perspective rear view of the embodiment shown in FIG. 8d with a bipronged fastener.
Figure 11:
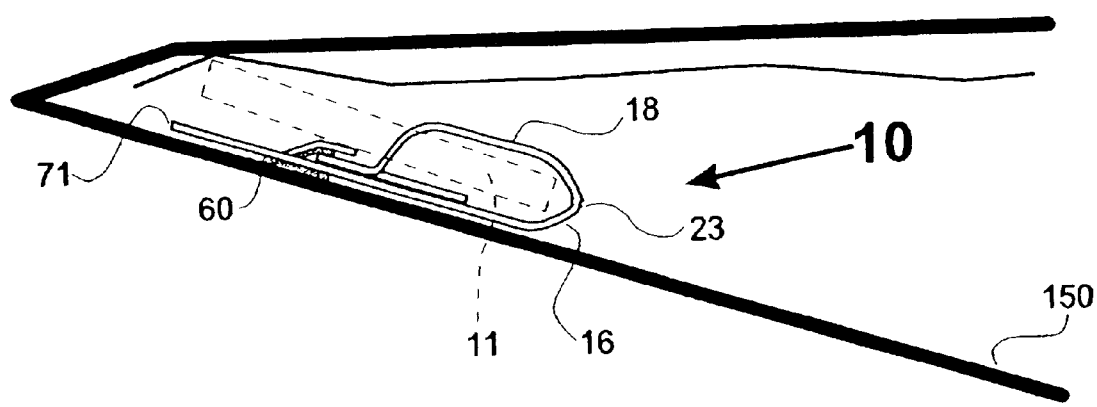
FIG. 11 is a side elevational view of the embodiment shown in FIG. 8d affixed to an interior surface of a file folder in an orientation where the interior surface of the file folder and its folded edge functionally serve to retain the object from above and across its exposed face.

Referring to FIG. 10, after the release liner 61 is removed, fastening edge 20 may be adhered to fastening tab 24 leaving the balance of the strip of adhesive 60 free to affix carrier 10 to a file folder 150 or like article. FIG. 11 shows carrier 10 attached to the inside surface of a file folder 150 oriented such that the folding edge and cover of the closed file folder 150 perform the retaining function normally performed by the top panel 68 and cover panel 70 of the carrier 10 in its preferred embodiment. Alternately, a bipronged fastener 50 with a fastener adhesive strip 54 can be used to attach carrier 10 in the same manner.

An alternate embodiment of the present invention is shown in FIGS. 12a and 12b. This embodiment is disclosed to demonstrate carrier 10 integrated with another article, such as the pocket folder 152 shown in the figures. The components and operation of carrier 10 are preferably substantially the same as described above except that one lateral edge of back panel 16 is connected to pocket folder 152 by an extension section 154. Also, glue or adhesive could be used to attach back panel 16 to the underlying folder leaf 156. By folding carrier 10 along folder scoreline 158, and then assembling carrier 10 in the above-mentioned manner, a pocket folder 152 with an integrally formed and internally disposed carrier 10, as shown in FIG. 12b, is constricted.

Figure 13:
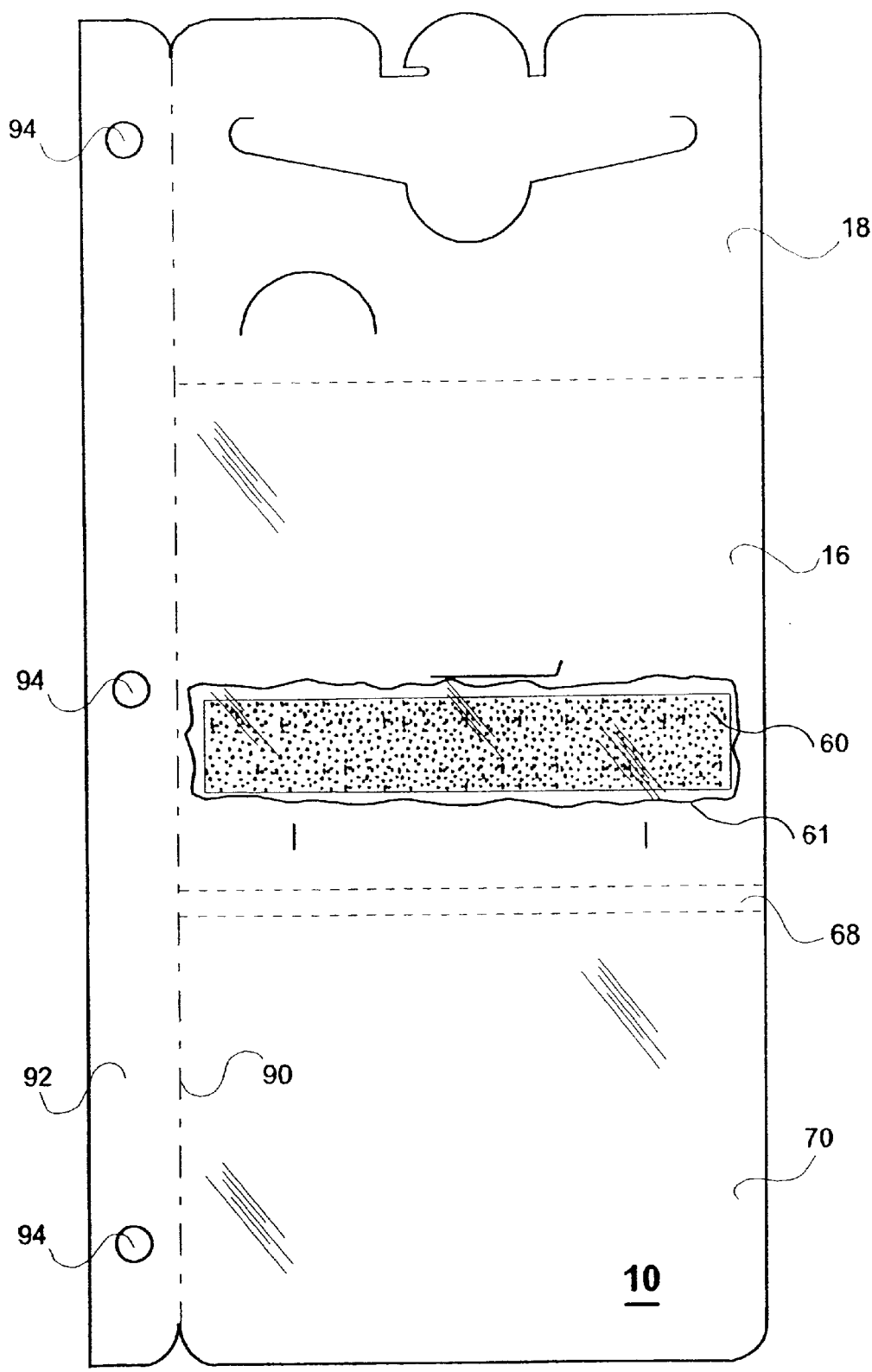
FIG. 13 is a plan view of still another embodiment of the present invention.

An alternate embodiment of the present invention is shown in FIG. 13. This embodiment is disclosed to demonstrate carrier 10 integrated into a disposable section 92 which is separated from the carrier 10 along a line of perforation 90. The components and operation of carrier 10 are substantially the same as described above except that one edge of front panel 18, back panel 16, top panel 68 and cover panel 70 is integrated with disposable section 92 along the line of perforation 90. Disposable section 92 has two or more mounting apertures 94 cut through it to allow storage in a standard ring or spiral binder prior to use. At the time of use, disposable section 92 is removed along line of perforation 90 and discarded. Carrier 10 is then folded and assembled in the same manner as described above.

Figure 14:
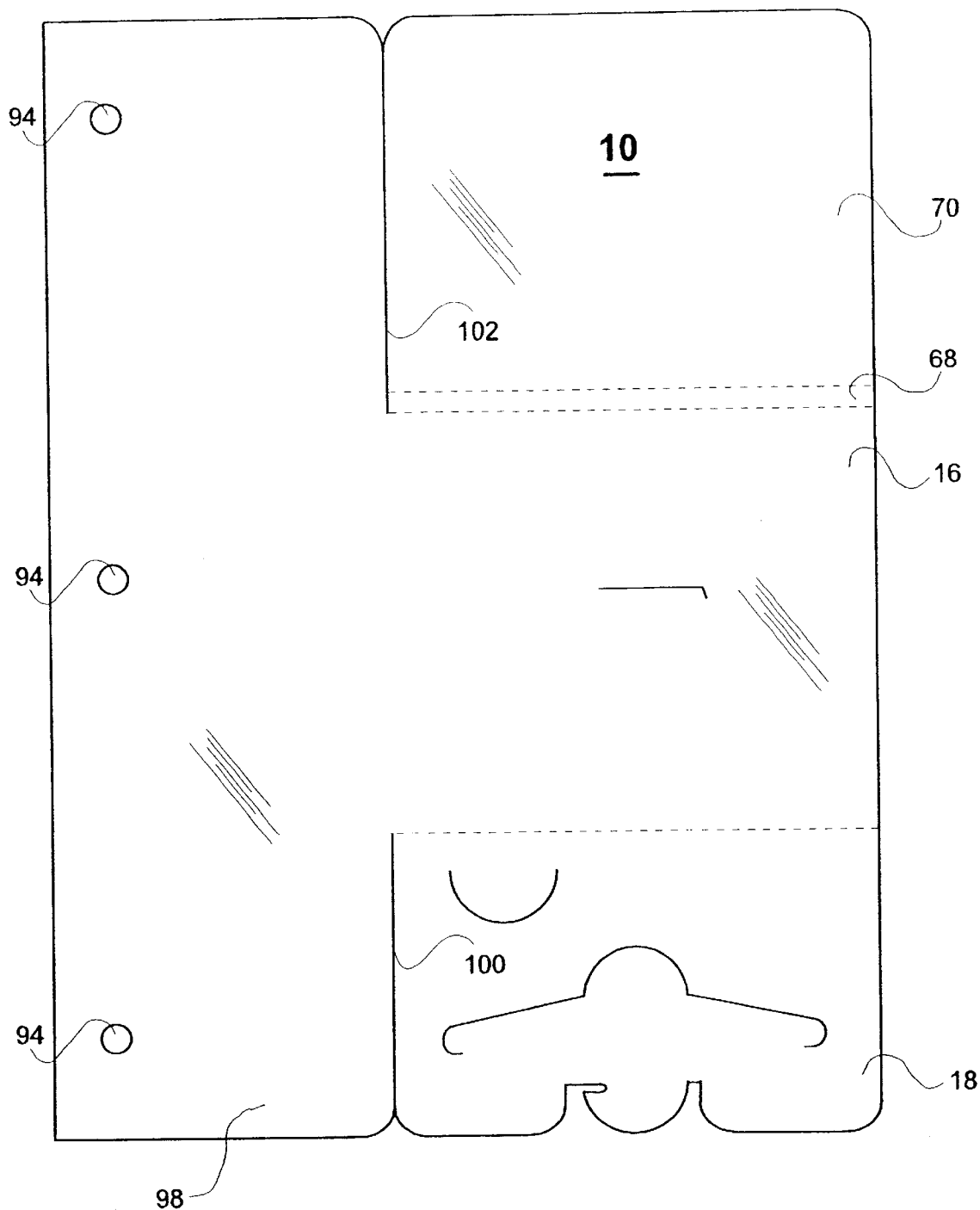
FIG. 14 is a plan view of yet still another embodiment of the present invention.

Another embodiment of the present invention is shown in FIG. 14. This embodiment is disclosed to demonstrate carrier 10 integrated into a side panel 98 the components and operation of carrier 10 are substantially the same as described above except that only one lateral edge of back panel 16 is integrated with side panel 98. Front panel 18 is separated from side panel 98 by a first side perforation 100 while top panel 68 and cover panel 70 are separated from side panel 98 by a second side perforation 102. Side panel 98 has two or more mounting apertures 94 cut through it to allow storage in a standard ring or spiral binder both prior to and during use. At the time of use, front panel 18 is separated from side panel 98 along first side perforation 100 and top panel 68 and cover panel 70 are separated from side panel 98 along second side perforation 102.

Carrier 10 is then folded and assembled in the same manner as described above except that it remains connected to side panel 98 along a lateral edge of back panel 16 after first side perforation 100 and second side perforation 102 are separated from side panel 98. In this configuration, carrier 10 is retained within a standard ring or spiral binder by this side panel during use.

Figure 15:
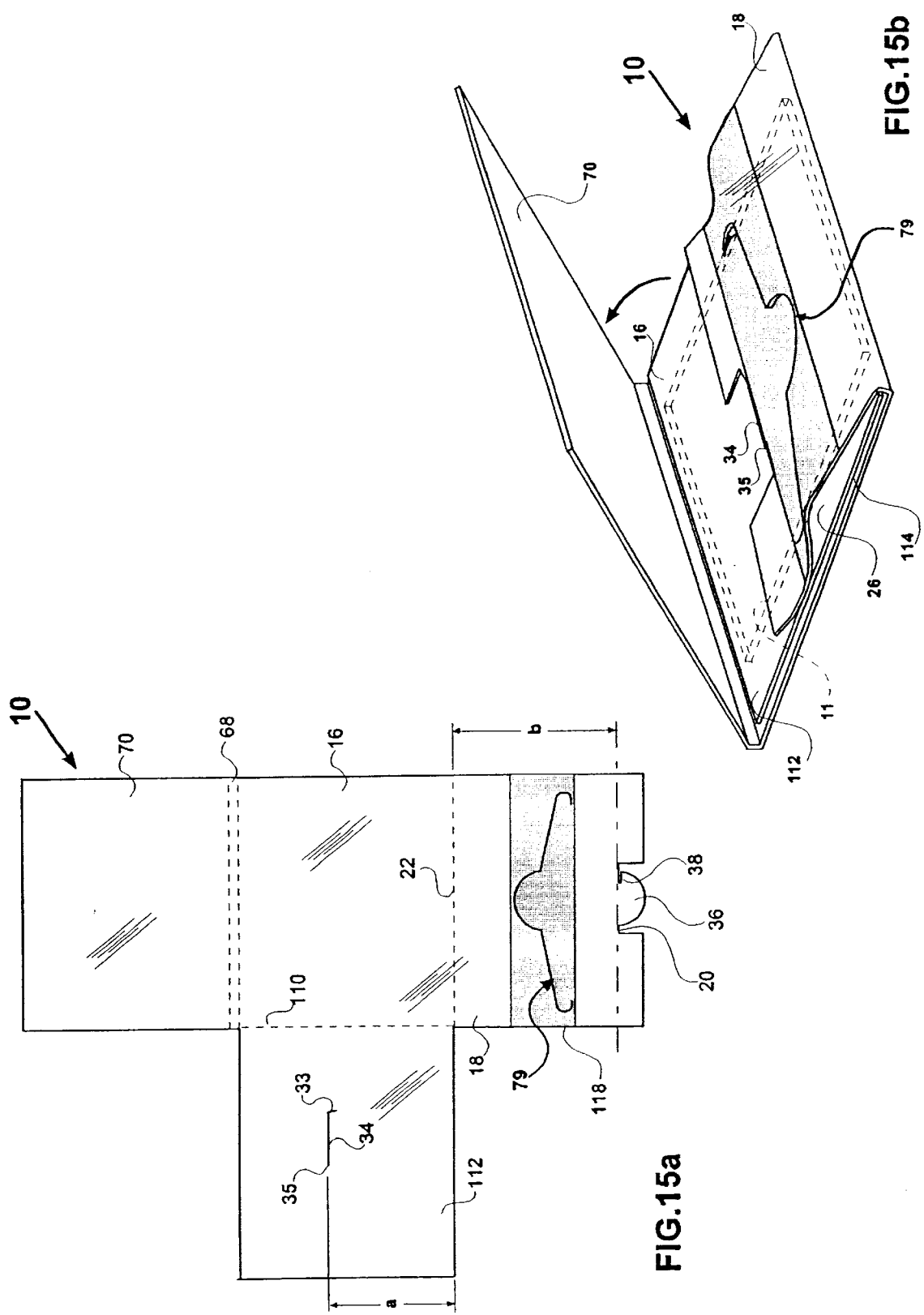
FIG. 15a is a plan view of a further embodiment of the present invention.
FIG. 15b is a perspective view of the embodiment shown in FIG. 15a in a folded orientation.

Yet another alternate embodiment of the present invention is shown in FIGS. 15a and 5b. This embodiment is disclosed to demonstrate carrier 10 with an integral side extension panel 112 which extends from back panel 16 along an extension scoreline 110. By folding this side extension panel 112 along extension scoreline 110 so as to overlie back panel 16, a document space 114 is formed between these panels as seen in FIG. 15b, open from above and on one side, that can receive contents such as a booklet of instructions. When carrier 10 is then folded and assembled in the manner described above, articles such as CDs can be stored and transported safely and securely. If carrier 10 is to be used for articles sensitive to scratching, such as CDs, a strip of soft fabric or paper 118 can be adhesively attached to its exterior face 14 and interior face 13 in the region of mouth flap 79 to reduce friction when articles are inserted and removed. In this embodiment, carrier 10 provides storage for articles and associated notes or instruction booklets and has expansive, unbroken surfaces for advertising or instructions on the exterior face 14 of back panel 16, top panel 68 and cover panel 70

Figure 16:
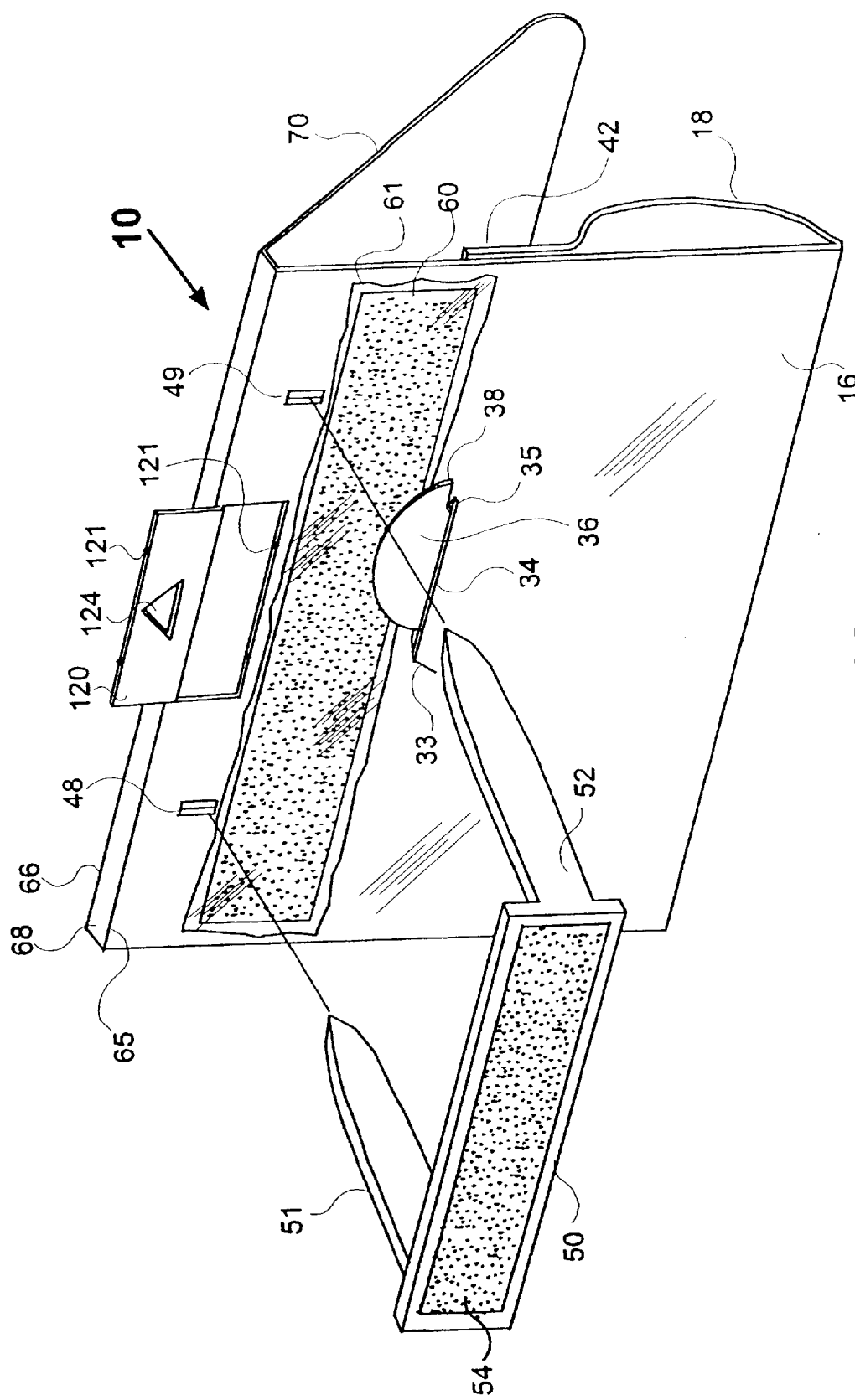
FIG. 16 is a perspective view of a still further embodiment of the present invention.

Still another alternate embodiment of the present invention is shown in FIG. 16. This embodiment is disclosed to demonstrate carrier 10 with a unshaped cut hanging tab 126 in the upper portion of the back panel 16, laterally centered with its open end adjacent the first top scoreline 65, and attached to the back panel 16 by at least two narrow points of interconnection or nicks 121 where the cut is interrupted. Hanging tab 120 has centered within it a hanging aperture 124. When the nicks 121 are manually broken and hanging tab 120 is bent upward through 180 degrees, hanging aperture 124 can be used to mount carrier 10 on a book or post for retailing operations.

Figure 17:
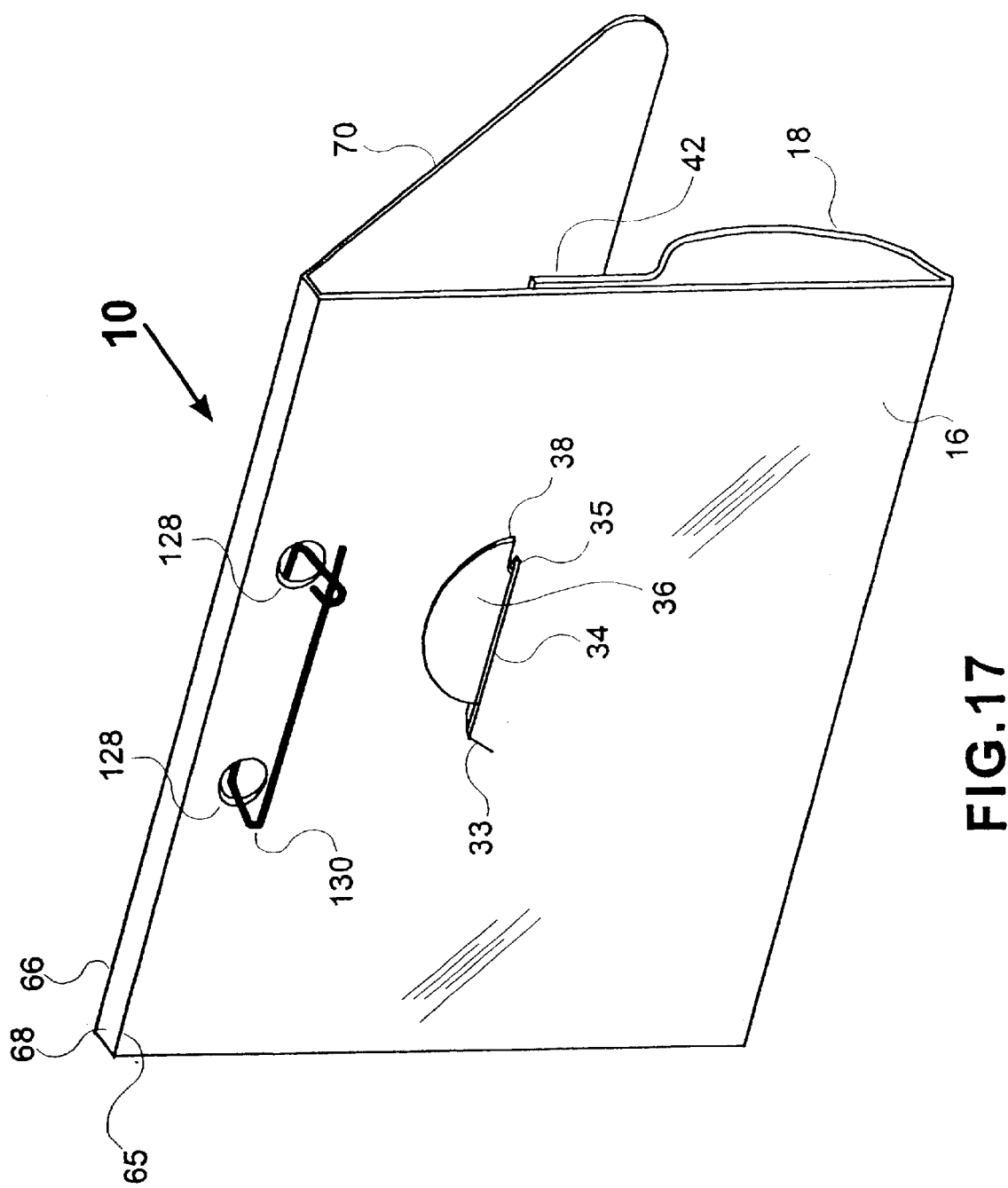
FIG. 17 is a perspective view of another embodiment of the present invention.

A further alternate embodiment of the present invention is shown in FIG. 17. This embodiment has two pin apertures 128 cut in the upper portion of back panel 16, laterally centered and adjacent to the first top scoreline 65. These pin apertures 128 receive a safety-pin fastener 130 oriented so the carrier 10 can be attached to a person's apparel for use in trade shows or as a means of identification based on information applied to the exterior face of the cover panel 70.

Figure 18:
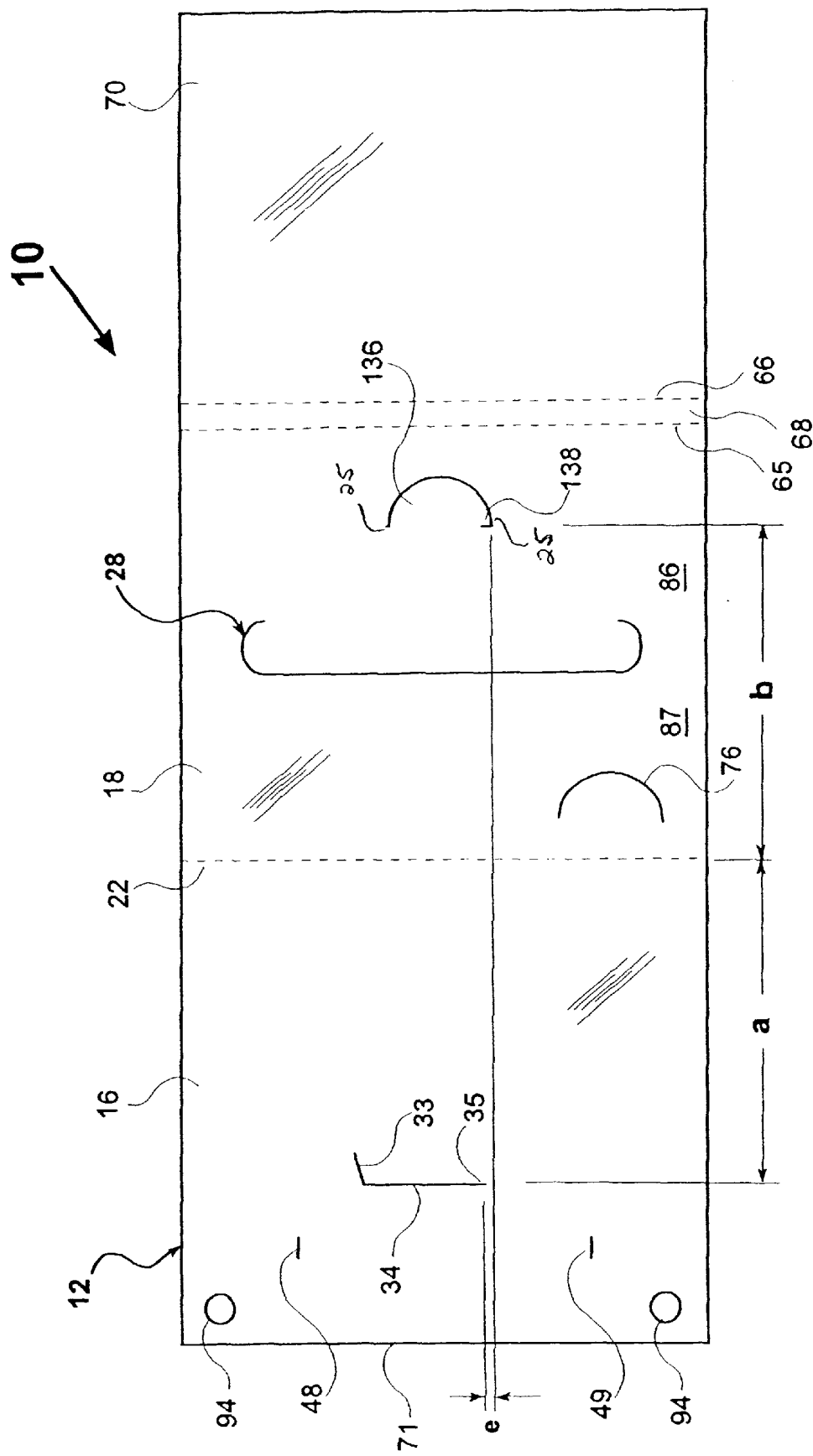
FIG. 18 is a plan view of another embodiment of the present invention.
Figure 19:
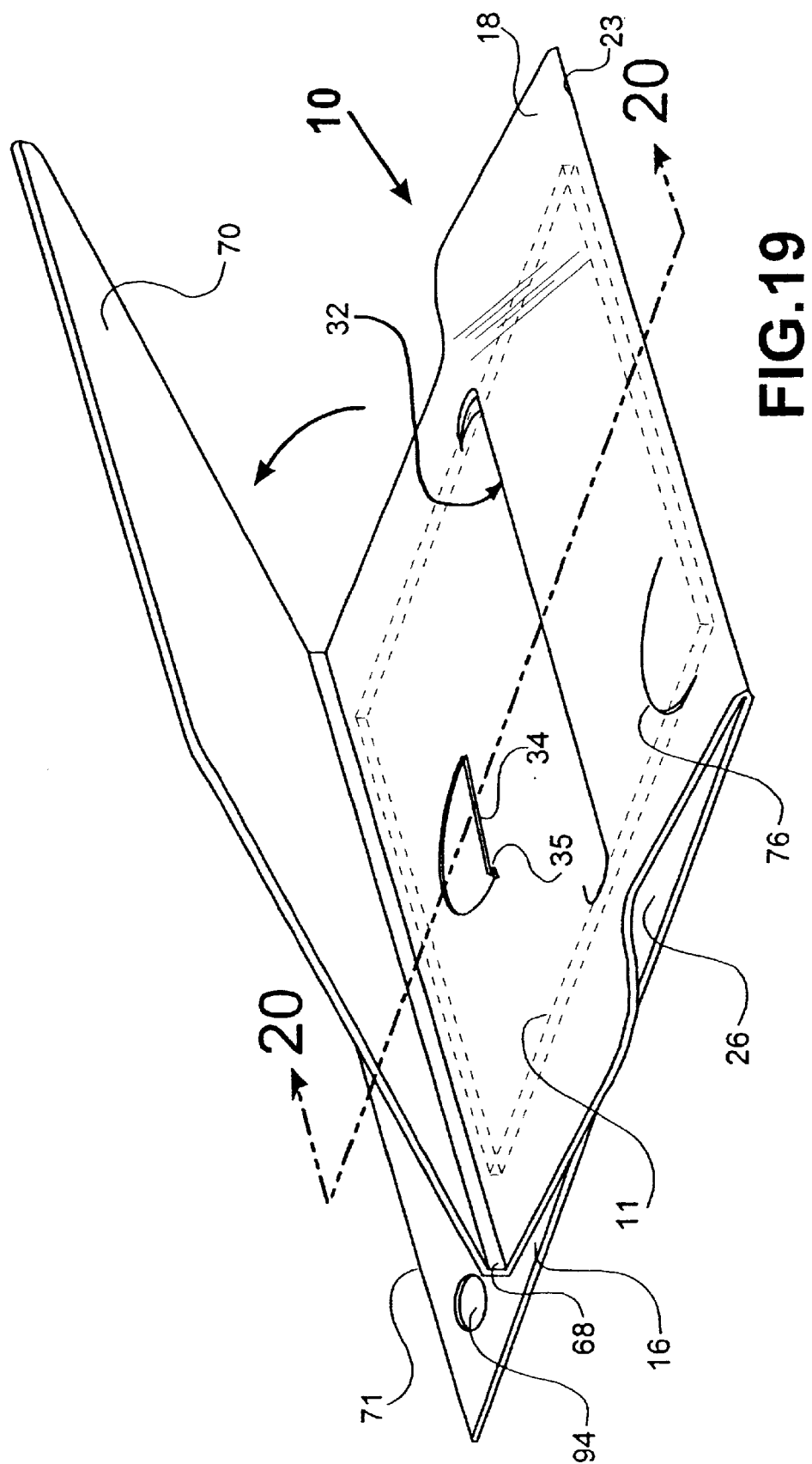
FIG. 19 is a perspective view of the carrier shown in FIG. 18 after it is folded and assembled.
Figure 20:
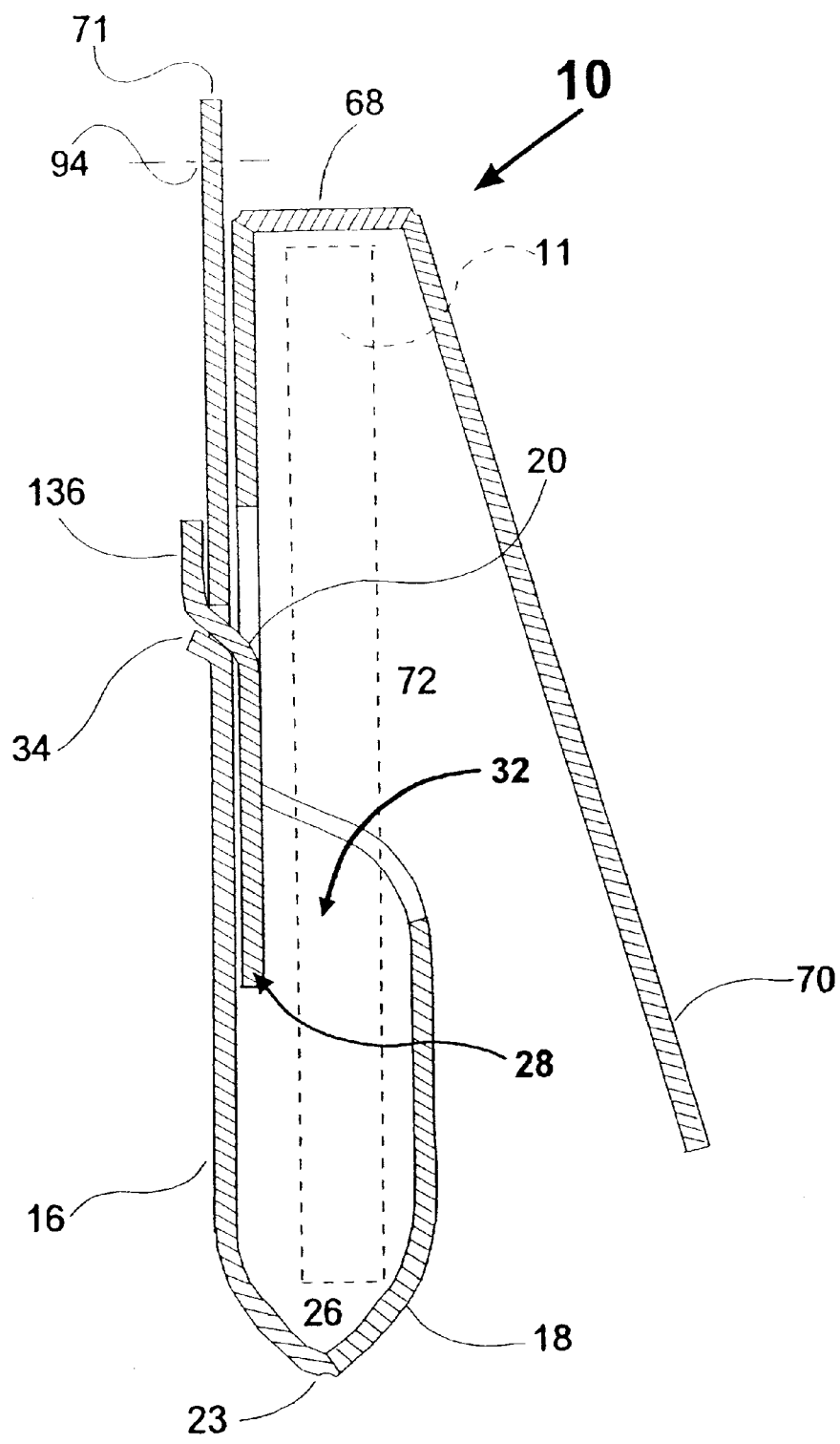
FIG. 20 is a cross-sectional view of the completed carrier taken substantially along line 20—20 of FIG. 19.
Figure 21:
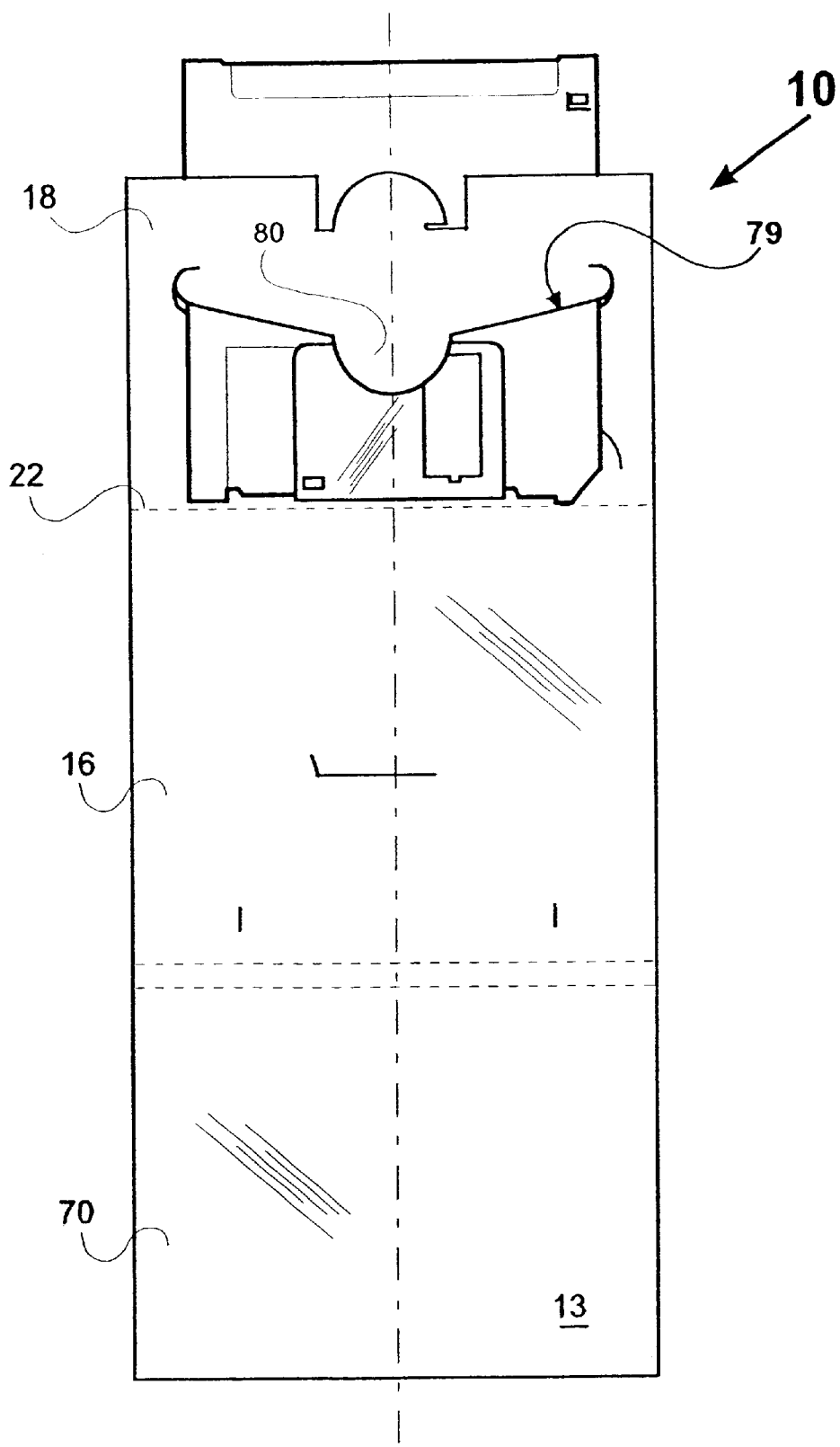
FIG. 21 is a plan view of the interior face of the carrier shown in FIG. 1 showing the function of the mouth flap design.

Yet still another alternate embodiment of the present invention is shown in FIG. 18. This embodiment is disclosed to demonstrate carrier 10 having a body 12 with a front panel 18 extended in length and its fastening edge 20 replaced by a semi-circular internal locking tab 136, laterally centered and having an internal lock slit 138 inset a distance (e), both cut through the faces of the front panel 18. This semi-circular shaped internal locking tab 136 has extremity points 25 disposed to form a line generally parallel to bottom scoreline 22 and located a predetermined distance (b) from it. The front panel 18 is further subdivided by a first top scoreline 65 and a second top scoreline 66 that define a top panel 68 and a cover panel 70. The back panel 16 has a fastening slit 34, laterally offset from center by a distance (e) to match the lateral inset of the internal lock slit 138. Carrier 10 is then assembled by first folding front panel 18 upwardly along bottom scoreline 22 to overlie the back panel 16. The internal locking tab 136 is then urged through the fastening slit 34 in a manner similar to the preferred embodiments described above, as shown in FIG. 20, whereupon the front panel 18 bows outward and the pocket mouth flap 28 flexes inward and internal lock slit 138 comes to engagingly overlie the offset end 35 of fastening slit 34. Finally, top panel 68 and cover panel 70 are folded along the two top scorelines to overlie the front panel 18 and its pocket mouth opening 32 as shown in FIG. 19. The opposing edge of the cover panel 70 is then inserted under the retaining tab 76. Two mounting apertures 94 adjacent the opposing edge of back panel 16 allow the carrier 10 to be retained by any two of the rings in a standard 3-ring binder. Alternately, a first prong slit 48, and a second prong slit 49 located adjacent the opposing edge of the back panel 16 can be used to attach a bipronged fastener 50 with a fastener adhesive strip 54 to the carrier 10, in a manner already disclosed above, so that the carrier 10 can be attached to articles such as a file folder 150 and the like in any desired orientation.

While this invention has been described as having exemplary embodiments, the present invention can be further modified within the spirit and scope of this disclosure and appended claims. This application is thus intended to cover any variations, uses, or adaptations of the invention using its general principles. For example, the flexible materials used to form the carrier may be of paper, cardboard, paperboard or plastic and colored, patterned or textured. Where desired for particular applications, the carrier material may be transparent to microwave energy and the carrier may be filled and shrink-wrapped for retail merchandising.

What is claimed is:

1. A carrier for retaining at least one object, the carrier comprising a body, the body including in combination an interior face, an exterior face, a bottom scoreline subdividing the body for folding into a front panel and a back panel, the back panel terminating in a distal edge opposite the bottom scoreline and including a fastening tab, cut interior to the edges and through the faces of the back panel, the tab having two extremity points, the extremity points defining a line disposed generally parallel to the bottom scoreline and spaced from the bottom scoreline by a distance (a), the front panel having a fastening edge opposing and generally parallel to the bottom scoreline, at least along its point of engagement with the fastening tab, and spaced from the bottom scoreline by a distance (b) so that, in assembling said carrier, the front panel is folded along the bottom scoreline so that its interior face overlies the interior face of the back panel and the fastening edge is engaged under the fastening tab, with the predetermined difference between the greater distance (b) and the lesser distance (a) causing the front panel to compressively bow outward from the back panel and create a pocket space between the opposing interior faces, sufficient in size to accommodate the thickness of the object to be retained.

2. A blank adapted for folding and assembly into a carrier for removeably receiving and securely retaining at least one object, comprising, a body formed from a unitary sheet of foldable material having an interior face and an exterior face and having two lateral edges, two opposing edges, and a transverse bottom scoreline between said opposing edges facilitating folding to subdivide the body into a back panel and a shorter front panel, said front panel when folded, adapted to be positioned in overlying relationship to a segment of the back panel bowing outwardly from the back panel to form a pocket space there between, retaining means for securely fastening said front panel in an overlying, outwardly bowed relationship to the back panel, and at least one pocket mouth opening means cut into the front panel for providing access to the pocket space when the front panel is fastened in an overlying outwardly bowed relationship to said back panel so as to receive and securely hold an object therein.

3. A blank as defined in claim 2, wherein said retaining means includes an adhesive.

4. A blank as defined in claim 2, wherein the back panel has an extension with a distal edge, removably or permanently bound to the cover spine of a booklet.

5. A blank as defined in claim 2, wherein said pocket mouth opening means includes a pocket mouth flap connected along one side by a zone of attachment to the front panel so that when said front panel is folded and fastened in overlying relationship to a segment of the back panel, the pocket mouth flap flexes inwardly into said pocket space along said zone of attachment thereby permitting easy insertion and retention of an object through the resulting pocket mouth opening and within the pocket space.

6. A blank as defined in claim 5, wherein the opposing edge of the front panel functions as a fastening edge, and said retaining means includes a fastening tab cut interior to the edges and through the face of the back panel having two extremity points defining a line disposed generally parallel to the bottom scoreline and spaced a predetermined distance from said bottom scoreline, so that said predetermined distance is shorter than the distance the fastening edge of the front panel is from the bottom scoreline, the fastening edge adapted to be engaged under the fastening tab when the blank is assembled into a carrier configuration.

7. A blank as defined in claim 5, wherein the opposing edge of the front panel functions as a fastening edge, and said retaining means includes a fastening slit having an offset end and an angled extension opposite said offset end, said fastening slit cut interior to the lateral edges and through the faces of said back panel, laterally offset from center by a predetermined distance, oriented parallel to and spaced a predetermined distance from said bottom scoreline and said fastening edge includes a locking tab, laterally centered and extending outward from said fastening edge, said locking tab having a width slightly less than said fastening slit and having an integral lock notch extending inward from its side the same distance which said fastening slit is offset from center, so as to align at its innermost point with said offset end, and positioned coincident with said fastening edge which is spaced a shorter distance from said bottom scoreline than said fastening slit is positioned from said bottom scoreline, so that, in assembling said carrier, when said front panel is folded along said bottom scoreline so that said interior face portion overlies said interior face portion of said back panel and when, thereafter, said fastening edge is made to slide towards bottom scoreline causing said front panel to bow outwardly followed by moving said front panel laterally to slidingly align said locking tab and said fastening slit so that said locking tab can be directly inserted into and urged through said fastening slit and when, there after, by allowing said front panel to return the same lateral distance, said lock notch engagingly overlies said offset end of said fastening slit and said locking tab is moved into overlapping alignment with said offset end so that said front panel is maintained in a secured and bowed engagement with said back panel and thereby restrained from further lateral and vertical movement.

8. A blank as defined in claim 7, wherein said fastening edge includes a first over-flap and a second over-flap symmetrically disposed to each side of said locking tab, the three extending roughly an equal distance outward from said fastening edge so that, during assembly of said carrier, these two over-flaps remain in close contact with said interior face portion of said back panel as said locking tab is inserted through said fastening slit, the pressure being exerted by these two over-flaps causing a reverse flexing to occur in said outwardly bowed front panel resulting in said locking tab being forced into close contact with said exterior face portion of said back panel when assembly is completed.

9. A blank as defined in claim 2, including an attachment means having two mounting slits, cut through the faces of said back panel, the mounting slits having a first prong slit and a second prong slit, laterally spaced apart near the distal edge of said back panel, said mounting slits being adapted to accept the prongs of a standard metal bipronged fastener device having a first prong and a second prong that are insertable through the two said mounting slits then bent inward, holding said carrier semi-permanently to said bipronged fastener to be attached in a suitable orientation to the inside cover of a file folder or to other suitable articles that may accept or be made ready to accept said bipronged fastener.

10. A blank as defined in claim 2, wherein the opposing edge of the front panel functions as a fastening edge, and the size of the pocket space and the thickness of the object to be accommodated is determined by the amount the front panel is bowed outwardly from the back panel which is determined by the difference between the distance from the bottom scoreline to the fastening edge of the front panel and the distance from the bottom scoreline to the point on the back panel to which the fastening edge is fastened when the blank is assembled into a carrier configuration, and wherein said back panel includes a first top scoreline and a second top scoreline, these two scorelines together defining between them a top panel of sufficient dimension to accommodate the thickness of an object to be carried while also defining a cover panel that can be folded along the two scorelines to pivot between an open position, providing access to said object, and a closed position overlying and enclosing an over-pocket space above said pocket mouth opening means, said cover panel, when closed, in close contact with said exterior face of said front panel thereby restraining said object from above and across its exposed face thereby allowing said carrier to be handled and transported unattached to another article while still retaining said object securely.

11. A blank as defined in claim 10, including securing means for securing said cover panel in the closed position, the securing means including a semi-circular retaining tab, cut interior to the edges and through the faces of the front panel, and having its end points positioned adjacent to and defining a line generally parallel to the bottom scoreline so the retaining tab can engage and overlie the distal edge of the cover panel and thereby retain the cover panel in its closed position overlying the exterior face of the front panel.

12. A blank as defined in claim 11, having a sticker seal for adhesively interlocking the retaining tab and the cover panel when the retaining tab is engaged and overlying the distal edge of the cover panel, thereby securing an object contained therein from pilferage.

13. A blank as defined in claim 2, wherein said pocket mouth opening means has a mouth flap, cut transversely and disposed generally midway between said fastening edge and said bottom scoreline of said front panel, said mouth flap further including laterally centered center curve having end points directed towards said fastening edge, a first angled side, and a second angled side, joined with the end points of said center curve and angled towards said fastening edge and extending outward towards the lateral edges of said front panel and terminating there in a first curve and a second end curve which are spaced inward from the lateral edges of said front panel and curved inward to face each other, the size and shape of said inwardly deflected mouth flap angled, dimensioned and positioned so that, when said carrier is assembled for use and a standard 3.5 inch computer data diskette is the object inserted, the computer data diskette having a conventional sliding metal access panel, the center curve will be in proper alignment to overlie the sliding metal access panel the diskette and thereby, during insertion and removal of the diskette, prevent the sliding metal access panel from snagging or catching on any point of said mouth flap.

14. A blank as defined in claim 11, including attachment means with a line of perforation joining the body with an elongated rectangular disposable section being of sufficient length to include, interior to and disposed adjacent the lateral edge opposing said line of perforation, at least two mounting apertures arranged to be in registration with and retained by rings or spiral wires or posts of a storage notebook or the like.

15. A blank as defined in claim 11, including attachment means having an elongated rectangular side panel with sufficient length to include, interior to and disposed adjacent its free lateral edge, at least two or more of said mounting apertures arranged to be in registration with and retained by the rings or spiral wires or posts of a storage notebook or the like and wherein said side panel remains attached along one lateral edge of said back panel while said front panel is separated along a first side perforation and said cover panel and said top panel are separated along a second side perforation and where said side panel continues to retain said carrier in the notebook, or like article, while it is folded and fastened and also afterward when it is used.

16. A blank as defined in claim 11, including a pocket folder, a lateral extension section of the hack panel connected to the pocket folder along a scoreline for folding the back panel into the pocket folder.

17. A blank as defined in claim 11, including a side extension panel hingedly affixed to said back panel along an extension scoreline, said fastening slit being located in said side extension panel so that, when said side extension panel is folded along said extension scoreline through 180 degrees to closely overlie the interior face of the back panel, the fastening slit is in proper position to engage with said locking tab during assembly of said carrier and thereby defining a document space between said side extension panel and said back panel which may be used to retain an instructional booklet or other similar document.

18. A blank as defined in claim 5, wherein the exterior face of the pocket mouth flap in the front panel and the immediate surrounding area are covered with a strip of soft fabric or paper adhesively attached and selected to reduce friction when an object, such as a compact disk, is repeatedly inserted and removed through said pocket mouth opening.

19. A blank as defined in claim 11, wherein an upper portion of back panel includes a hanging tab laterally centered and defined by a unshaped slit disposed with its end points adjacent said first top scoreline and interrupted by at least two nicks in its length that define webs of interconnection with said back panel, and further including a hanging aperture centered within said hanging tab for receiving the hook or post of a retail display stand.

20. A blank as defined in claim 11, wherein the upper portion of said back panel includes two pin apertures, spaced apart and laterally centered and transversely disposed adjacent to said first top scoreline whereby the base of a standard safety-pin fastener may be inserted and retained for purposes of attaching said carrier to a person's apparel for purposes of identification using said cover panel area, and at trade shows for data exchange, using a retained digital storage device like a 3.5 inch computer data diskette.

21. A blank as defined in claim 2, wherein the body includes an additional portion extending from the front panel, the portion extending from the front panel having a first top scoreline and a second top scoreline together defining between them a top panel of sufficient dimension to accommodate the object's thickness and also defining a cover panel that can be folded along these two scorelines to pivot between an open position providing access to the object and a closed position overlying and enclosing an over-pocket space above the pocket mouth opening means when the blank is assembled.

22. A blank as defined in claim 21, wherein the body has an additional portion extending from the back panel and at least two mounting apertures formed in the portion extending from the back panel to be retained by the rings in a standard binder.

23. A blank as defined in claim 21, wherein said pocket mouth opening means includes a pocket mouth flap connected along one side by a zone of attachment to the front panel so that when said front panel is folded and fastened in overlying relationship to a segment of the back panel, the pocket mouth flap flexes inwardly into said pocket space along said zone of attachment thereby permitting easy insertion and retention of an object through the pocket mouth opening means and within the pocket space.

24. A blank as determined in claim 23, wherein said retaining means includes a locking tab laterally centered with an internal lock slit inset a predetermine distance from center, both the locking tab and the internal lock slit cut through the faces of the front panel, said locking tab having extremity points disposed to form a line generally parable to the bottom scoreline and located a predetermined distance from said bottom scoreline, the retaining means also including a fastening slit in the back panel laterally off set from center by a distance which matches the lateral insert of the internal lock slit from center and is located a shorter distance from said bottom scoreline than said locking tab, so that in assembling the carrier, when said front panel is folded along said bottom scoreline so that said interior face portion overlies said interior face portion of said back panel and the locking tab is urged through the fastening slit causing said front panel to bow outwardly and the internal lock slit to engagingly overlie the offset end of the fastening slit, said front panel is maintained in secured and bowed engagement with said back panel and thereby restrained from further lateral and vertical movement.

25. A blank as defined in claim 24, including securing means for securing said cover panel in the closed position, the securing means including a semi-circular retaining tab, cut interior to the edges and through the front panel, and having its end points positioned adjacent to and defining a line generally parallel to the bottom scoreline so the retaining tab can engage and overlie the distal edge of the cover panel and thereby retain the cover panel in its closed position overlying the exterior face of the front panel.

26. A blank as defined in claim 25, having a sticker seal for adhesively interlocking the retaining tab and the cover panel when the retaining tab is engaged and overlying the distal edge of the cover panel, thereby securing an object contained therein from pilferage.

* * * * *